United States Patent
Zhu et al.

(10) Patent No.: US 11,870,996 B2
(45) Date of Patent: Jan. 9, 2024

(54) TRANSFORM BYPASS CODED RESIDUAL BLOCKS IN DIGITAL VIDEO

(71) Applicant: Bytedance Inc., Los Angeles, CA (US)

(72) Inventors: Weijia Zhu, San Diego, CA (US); Li Zhang, San Diego, CA (US); Jizheng Xu, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/872,571

(22) Filed: Jul. 25, 2022

(65) Prior Publication Data

US 2022/0385915 A1 Dec. 1, 2022

Related U.S. Application Data

(63) Continuation of application No. 17/522,387, filed on Nov. 9, 2021, now Pat. No. 11,490,089, which is a
(Continued)

(30) Foreign Application Priority Data

May 19, 2019 (WO) ................ PCT/CN2019/087509

(51) Int. Cl.
*H04N 11/02* (2006.01)
*H04N 19/132* (2014.01)
(Continued)

(52) U.S. Cl.
CPC ......... *H04N 19/132* (2014.11); *H04N 19/105* (2014.11); *H04N 19/176* (2014.11); *H04N 19/70* (2014.11)

(58) Field of Classification Search
CPC .................................................. H04N 19/132
(Continued)

(56) References Cited

U.S. PATENT DOCUMENTS

| 7,076,392 B1 | 7/2006 | Wilson |
| 9,426,466 B2 | 8/2016 | Van Der Auwera et al. |

(Continued)

FOREIGN PATENT DOCUMENTS

| CN | 104378637 A | 2/2015 |
| CN | 104471935 A | 3/2015 |

(Continued)

OTHER PUBLICATIONS

Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.

(Continued)

*Primary Examiner* — Leron Beck
(74) *Attorney, Agent, or Firm* — Conley Rose, P.C.

(57) ABSTRACT

A method for video processing includes determining that a size of a residual block of a video is larger than a maximum block size allowed for a transform skip mode, in which, during a decoding operation, residual coefficients are decoded without performing an inverse transform operation; splitting, based on the size of a residual block, the residual block into multiple regions, wherein each region represents a portion of the residual block of a difference between a portion of a current video block and a prediction block corresponding to the portion of the current video block; and determining a reconstructed current video block from the residual block based on selectively performing the inverse transform operation according to an indicator that indicates the transform skip mode.

20 Claims, 32 Drawing Sheets

Related U.S. Application Data continuation of application No. PCT/US2020/033416, filed on May 18, 2020.

(51) Int. Cl.
*H04N 19/105* (2014.01)
*H04N 19/176* (2014.01)
*H04N 19/70* (2014.01)

(58) Field of Classification Search
USPC ...................................... 375/240.01–240.29
See application file for complete search history.

(56) References Cited

U.S. PATENT DOCUMENTS

| | | | |
|---|---|---|---|
| 9,807,423 | B1 | 10/2017 | Han et al. |
| 10,382,768 | B2 | 8/2019 | Huang et al. |
| 10,582,203 | B2 | 3/2020 | Huang et al. |
| 10,609,395 | B2 | 3/2020 | Kerofsky et al. |
| 10,827,186 | B2 | 11/2020 | Moccagatta et al. |
| 2010/0086031 | A1 | 4/2010 | Chen et al. |
| 2012/0230417 | A1 | 9/2012 | Sole Rojals et al. |
| 2013/0003839 | A1 | 1/2013 | Gao et al. |
| 2013/0016789 | A1 | 1/2013 | Lou et al. |
| 2013/0101042 | A1 | 4/2013 | Sugio et al. |
| 2013/0202038 | A1 | 8/2013 | Seregin et al. |
| 2013/0223521 | A1 | 8/2013 | Kim et al. |
| 2013/0251026 | A1 | 9/2013 | Guo et al. |
| 2013/0294524 | A1 | 11/2013 | Van der Auwera |
| 2014/0016698 | A1 | 1/2014 | Joshi et al. |
| 2014/0056347 | A1 | 2/2014 | Xu |
| 2014/0098856 | A1 | 4/2014 | Gu et al. |
| 2014/0169452 | A1 | 6/2014 | Lim et al. |
| 2014/0254670 | A1 | 9/2014 | Kwon et al. |
| 2014/0286413 | A1 | 9/2014 | Joshi et al. |
| 2014/0348247 | A1 | 11/2014 | Tsukuba et al. |
| 2014/0362917 | A1 | 12/2014 | Joshi et al. |
| 2014/0376634 | A1 | 12/2014 | Guo et al. |
| 2015/0016521 | A1 | 1/2015 | Peng et al. |
| 2015/0092855 | A1 | 4/2015 | Chou et al. |
| 2015/0156502 | A1 | 6/2015 | Cheon et al. |
| 2016/0100189 | A1 | 4/2016 | Pang |
| 2016/0227245 | A1 | 8/2016 | Liu et al. |
| 2020/0186838 | A1 | 6/2020 | Zhao et al. |
| 2020/0260070 | A1 | 8/2020 | Yoo et al. |
| 2021/0084319 | A1 | 3/2021 | Zhao et al. |
| 2022/0007048 | A1 | 1/2022 | He et al. |

FOREIGN PATENT DOCUMENTS

| | | |
|---|---|---|
| CN | 105165012 A | 12/2015 |
| CN | 105264891 A | 1/2016 |
| CN | 105684442 A | 6/2016 |
| CN | 106105202 A | 11/2016 |
| CN | 107005717 A | 8/2017 |
| CN | 107211144 A | 9/2017 |
| CN | 108632611 A | 10/2018 |
| KR | 20150011787 A | 2/2015 |
| WO | 2014176362 A1 | 10/2014 |
| WO | 2016072745 A1 | 5/2016 |
| WO | 2019076290 A1 | 4/2019 |

OTHER PUBLICATIONS

Bossen, F., Retrieved From the Internet, https://vcgit.hhi.fraunhofer.de/jvet/VVCSoftware_VTM/tags/VTM-4.0, Oct. 12, 2022, 2 pages.
Document: JVET-N0843, Xu, X., et al., "CE8-related: Combination test of JVET-N0176/JVET-N0317/JVET-N0382 on simplification of IBC vector prediction," Joint Video Experts Team (JVET) of ITU-T SG 16 WP 3 and ISO/IEC JTC 1/SC 29/WG 11 14th Meeting: Geneva, CH, Mar. 19-27, 2019, 11 pages.
Document: JVET-M0464-v4, Bross, B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.
Document: JVET-N0280, Bross, B., et al., CE8: Residual Coding for Transform Skip Mode (CE8-4.3a, CE8-4.3b, CE8-4.4a, and CE8-4.4b), Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-N0193, Koo, M., et al., "CE6: Reduced Secondary Transform (Rst) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.
Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
"Information Technology—High efficiency coding and media delivery in heterogeneous environments—Part 2: High Efficiency Video Coding", ISO/IEC Dis 23008-2:201x (4th Ed.), ISO/IEC JTC 1/SC 29/WG 11 N 17661, Apr. 20, 2018, 3 pages.
Office Action dated Mar. 2, 2022, 19 pages, U.S. Appl. No. 17/522,387, filed Nov. 9, 2021.
Foreign Communication From a Related Counterpart Application, International Application No. PCT/US2020/033416, English Translation of International Search Report dated Jul. 29, 2020, 11 pages.
Foreign Communication From a Related Counterpart Application, International Application No. PCT/US2020/033411, English Translation of International Search Report dated Nov. 9, 2020, 16 pages.
Document: JVET-N0428_v2, Yoo, S., et al., "CE8-4.1 : Rearrangement of the residual block for transform skip," Joint Video Experts Team (JVET) of ITU-T SG 16 WP 3 and ISO/IEC JTC 1/SC 29/WG 11 14th Meeting: Geneva, CH, Mar. 19- 27, 2019, 14 pages.
Document: JVET-N0429_v2, Yoo, S., et al., "CE8-4.2 : Residual Coding for Transform Skip, with various maximum context coded bins," Joint Video Experts Team (JVET) of ITU-T SG 16 WP 3 and ISO/IEC JTC 1/SC 29/WG 11 14th Meeting: Geneva, CH, Mar. 19-27, 2019, 9 pages.

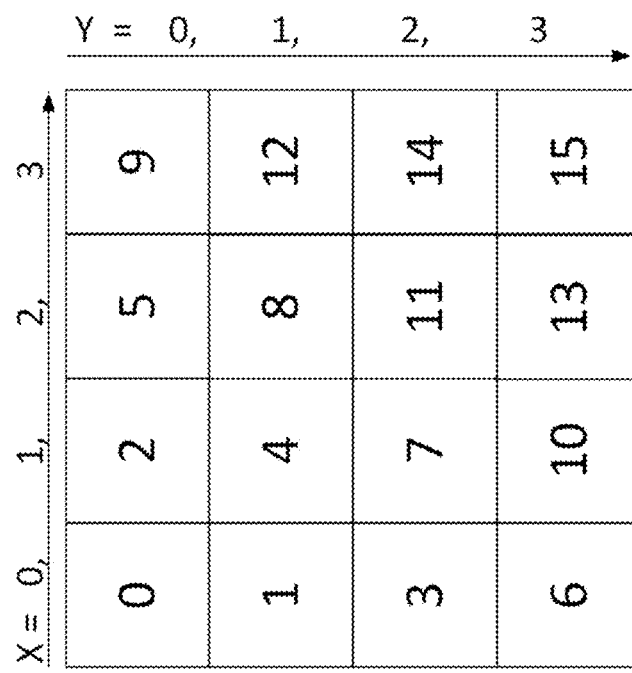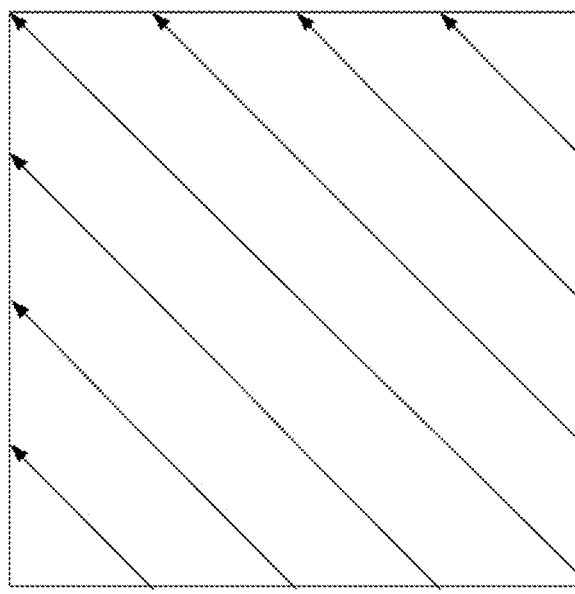
FIG. 13

1500 ⤹

┌─────────────────────────────────────────────────┐
│ Making a decision, for a current video block with a height greater than 32 and a width greater than 32, regarding a selective application of a transform-based coding mode on the current video block │ ～1502
└─────────────────────────────────────────────────┘
                          │
┌─────────────────────────────────────────────────┐
│ Performing, based on the decision, a conversion between the current video block and a bitstream representation of the current video block │ ～1504
└─────────────────────────────────────────────────┘

FIG. 15A

```
┌─────────────────────────┐
│ Splitting a current video block into two or more regions, wherein │ ~1522
│ a first region of the two or more regions is coded without an     │
│ application of a transform                                        │
└─────────────────────────┘
            │
┌─────────────────────────┐
│ Performing, based on the splitting, a conversion between the current │ ~1524
│ video block and a bitstream representation of the current video block│
└─────────────────────────┘
```

1542 Performing, during a conversion between a current video block and a bitstream representation of the current video block, a sub-block transform (SBT) on the current video block that includes applying an identity transform to at least one dimension

Performing a conversion between a current video block of a video and a bitstream representation of the video; wherein the conversion uses a sub-block transform mode in which the current video block is split into multiple horizontal or vertical partitions; and wherein, during an encoding operation, a forward transform is applied to residual values of some of the partitions of the current video block for coding into the bitstream representation, wherein the forward transform comprises a vertical transform and a horizontal transform, at least one being an identity transform, or wherein, during a decoding operation, an inverse transform is applied to residual values of the current video block decoded from the bitstream representation to generate the current video block, wherein the inverse transform comprises an inverse vertical transform and an inverse horizontal transform, at least one being an identity transform ~ 2502

FIG. 25

TRANSFORM BYPASS CODED RESIDUAL BLOCKS IN DIGITAL VIDEO

CROSS REFERENCE TO RELATED APPLICATIONS

This application is a continuation of U.S. application Ser. No. 17/522,387 filed on Nov. 9, 2021, which is a continuation of International Patent Application No. PCT/US2020/033416, filed on May 18, 2020, which claims the priority to and benefits of International Patent Application No. PCT/CN2019/087509, filed on May 19, 2019. All the aforementioned patent applications are hereby incorporated by reference in their entireties.

TECHNICAL FIELD

This document is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to transform design for large blocks in video coding are described. The described methods may be applied to both the existing video coding standards (e.g., High Efficiency Video Coding (HEVC)) and future video coding standards (e.g., Versatile Video Coding (VVC)) or codecs.

In one exemplary aspect, a method of video processing is disclosed. The method includes determining, for a current video block of a video having a size less than or equal to a maximum block size, that use of a coding mode is applicable to the current video block; and performing, based on the determining, a conversion between the current video block and a bitstream representation of the current video block, wherein the performing the conversion, during an encoding operation, includes using the coding mode in which the current video block is coded without performing a forward transform operation, or wherein the performing the conversion, during a decoding operation, includes using the coding mode in which the current video block is generated from the bitstream representation without performing an inverse transform operation.

In another exemplary aspect, a method of video processing is disclosed. The method includes determining that a current video block of a video has a width and/or a height greater than 32; and performing, based on the determining, a conversion between the current video block and a bitstream representation of the current video block, wherein the performing the conversion, during an encoding operation, includes coding the current video block without performing a forward transform operation, or wherein the performing the conversion, during a decoding operation, includes generating the current video block from the bitstream representation without performing an inverse transform operation.

In another exemplary aspect, a method of video processing is disclosed. The method includes performing a conversion between a current video block of a video and a bitstream representation of the video, wherein the current video block is split into a plurality of regions, and wherein a first region in the plurality of regions uses a coding mode in which the first region is coded in the coded representation without applying a forward transform or reconstructed from the coded representation without applying an inverse transform.

In another exemplary aspect, a method of video processing is disclosed. The method includes making a determination for a conversion between a current video block of a video and a bitstream representation of the video to disable use of a transform operation during the conversion; and performing, due to the determination, the conversion using a resampling operation that comprises: coding a downsampled version of a residual block of the current video block into the bitstream representation, or reconstructing the current video block by upsampling the downsampled version of the residual block from the bitstream representation.

In another exemplary aspect, a method of video processing is disclosed. The method includes performing a conversion between a current video block of a video and a bitstream representation of the video; wherein the conversion uses a sub-block transform mode in which the current video block is split into multiple horizontal or vertical partitions; and wherein, during an encoding operation, a forward transform is applied to residual values of some of the partitions of the current video block for coding into the bitstream representation, wherein the forward transform comprises a vertical transform and a horizontal transform, at least one being an identity transform, or wherein, during a decoding operation, an inverse transform is applied to residual values of the current video block decoded from the bitstream representation to generate the current video block, wherein the inverse transform comprises an inverse vertical transform and an inverse horizontal transform, at least one being an identity transform.

In another exemplary aspect, a method of video processing is disclosed. The method includes determining, for a current video block of a video having a size K*L pixels, where K and L are integers, a residual block of size K*L by subtracting a prediction block from the current video block; splitting the residual block into a plurality of regions; and encoding each region into a bitstream representation of the video as a transform unit by scanning residual coefficients in each region in a scanning order, wherein a region from the plurality of regions is encoded according to a transform skip (TS) mode in which, during an encoding operation, the current video block is coded without performing a forward transform operation.

In another exemplary aspect, a method of video processing is disclosed. The method includes determining, based on a size of a residual block, that the residual block of a video having a size K*L pixels, where K and L are integers, is coded in a bitstream representation of the video as a plurality of regions, wherein each region represents a portion of the residual block of a difference between a portion of a current video block and a prediction block corresponding to the portion of the current video block; determining residual coefficients for each region from the bitstream representation of the video as a transform unit by placing the residual coefficients in each region in an inverse scanning order, wherein the residual coefficients for each region are determined based on a selective use of an inverse transform operation according to a coding mode indicator; generating the residual block based on the residual coefficients; and determining a reconstructed current video block from the residual block and the prediction block.

In another exemplary aspect, a method of video processing is disclosed. The method includes determining that a size of a residual block of a video is larger than a maximum block size allowed for a transform skip mode, in which, during a decoding operation, residual coefficients are decoded without performing an inverse transform operation; splitting, based on the size of a residual block, the residual block into multiple regions, wherein each region represents a portion of the residual block of a difference between a portion of a current video block and a prediction block corresponding to the portion of the current video block; and determining a reconstructed current video block from the residual block based on selectively performing the inverse transform operation according to an indicator that indicates the transform skip mode.

In another exemplary aspect, a method of video processing is disclosed. The method includes making a decision, for a current video block with a height greater than 32 and a width greater than 32, regarding a selective application of a transform-based coding mode on the current video block; and performing, based on the decision, a conversion between the current video block and a bitstream representation of the current video block.

In another exemplary aspect, a method of video processing is disclosed. The method includes determining that a current video block is a transform bypassed (TransBypass)-coded residual block; splitting, based on the determining, the current video block into multiple regions; and performing, while treating each of the multiple regions as a transform unit, a conversion between the current video block and a bitstream representation of the current video block.

In yet another exemplary aspect, a method of video processing is disclosed. The method includes splitting a current video block into two or more regions, wherein a first region of the two or more regions is coded without an application of a transform; and performing, based on the splitting, a conversion between the current video block and a bitstream representation of the current video block.

In yet another exemplary aspect, a method of video processing is disclosed. The method includes determining that a current video block is a transform bypassed (Trans-Bypass)-coded residual block; and performing, based on the determining and during a conversion between the current video block and a bitstream representation of the current video block, a downsampling process on the current video block prior to an application of a coding mode to the current video block.

In yet another exemplary aspect, a method of video processing is disclosed. The method includes performing, during a conversion between a current video block and a bitstream representation of the current video block, a sub-block transform (SBT) on the current video block that includes applying an identity transform to at least one dimension.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 13 shows an example of a diagonal up-right scan order for a 4×4 coding group.
FIGS. 15A-15E are example flowcharts of video processing methods.
FIGS. 21-28 are example flowcharts of video processing methods.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is generally related to video coding technologies. Specifically, it is related to transform design for large blocks in video coding. It may be applied to the existing video coding standard like High Efficiency Video Coding (HEVC), or the standard Versatile Video Coding (VVC) to be finalized. It may be also applicable to future video coding standards or video codec.

2. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced moving pictures experts group (MPEG)-1 and MPEG-4 Visual, and the two organizations jointly produced the H.262/MPEG-2 Video and H.264/MPEG-4 Advanced Video Coding (AVC) and H.265/ high efficiency video coding (HEVC) standards [1,2]. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at:

http://phenix.it-sudparis.eu/jvet/doc_end_user/current_document.php?id=5755

The latest reference software of VVC, named VTM, could be found at:

https://vcgit.hhi.fraunhofer.de/jvet/VVCSoftware_VTM/tags/VTM-4.0

2.1 Intra Block Copy

Figure 1:
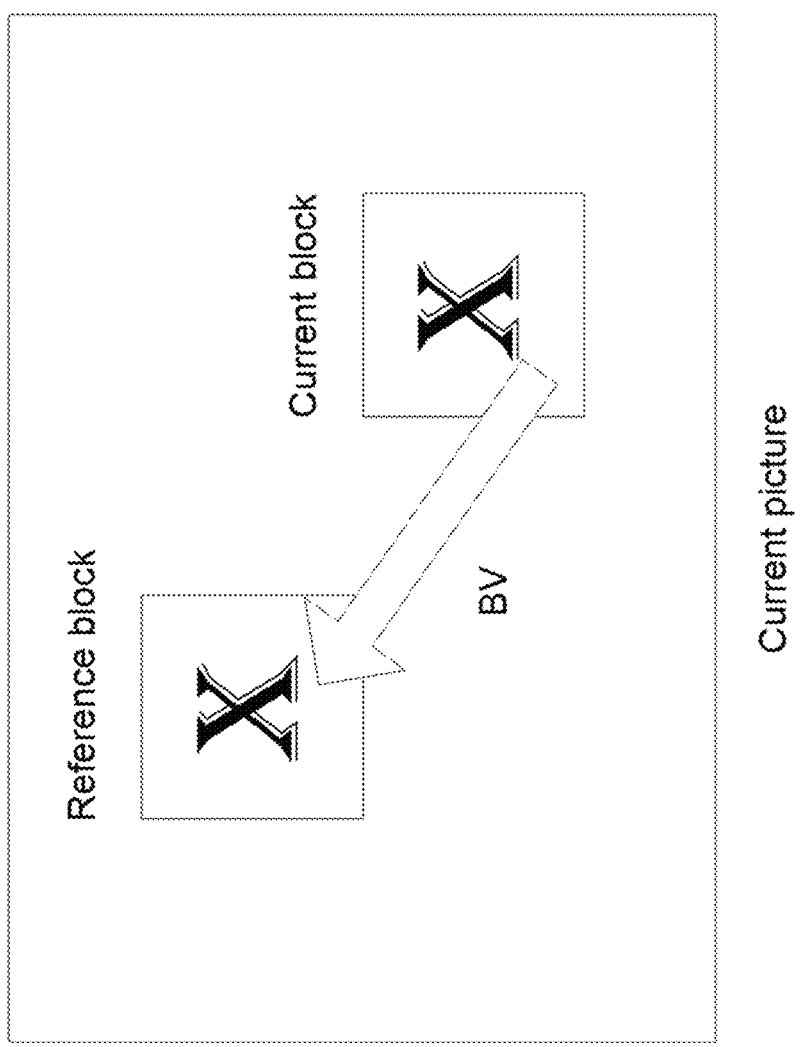
FIG. 1 shows an example of intra block copy.

Intra block copy (IBC), a.k.a. current picture referencing, has been adopted in HEVC Screen Content Coding extensions (HEVC-SCC) [1] and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block may have already been reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3-dimensional (3D) video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX}=(\text{ChromaArrayType}==0)?0:(\text{mvCLX}[0]\&0x7?2:0) \qquad (8\text{-}106)$$

$$\text{offsetY}=(\text{ChromaArrayType}==0)?0:(\text{mvCLX}[1]\&0x7?2:0) \qquad (8\text{-}107)$$

In bitstream conformance, when the reference picture is the current picture, the luma motion vector mvLX may obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output may be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output may be equal to TRUE.

One or both the following conditions may be true:

The value of (mvLX[0]>>2)+nPbW+xB1+offsetX is less than or equal to 0.

The value of (mvLX[1]>>2)+nPbH+yB1+offsetY is less than or equal to 0.

The following condition may be true:

$$(xPb+(mvLX[0]>>2)+nPbSw-1+\text{offsetX})/\text{CtbSizeY}-xCurr/\text{CtbSizeY}<=yCurr/\text{CtbSizeY}-(yPb+(mvLX[1]>>2)+nPbSh-1+\text{offsetY})/\text{CtbSizeY} \qquad (8\text{-}108)$$

Thus, the case that the reference block overlaps with the current block or the reference block is outside of the picture will not happen. There may be no need to pad the reference or prediction block.

2.3 IBC in VVC Test Model

In the current VVC test model, i.e. VTM-4.0 design, the whole reference block should be with the current coding tree unit (CTU) and does not overlap with the current block. Thus, there may be no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The construction of the IBC merge list can be summarized according to the following sequence of steps:
   Step 1: Derivation of spatial candidates
   Step 2: Insertion of HMVP candidates
   Step 3: Insertion of pairwise average candidates In the derivation of spatial merge candidates, a maximum of four merge candidates are selected among candidates located in the positions A1, B1, B0, A0 and B2. The order of derivation is A1, B1, B0, A0 and B2. Position B2 may only be considered only when any PU of position A1, B1, B0, A0 is not available (e.g. because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

Figure 2:
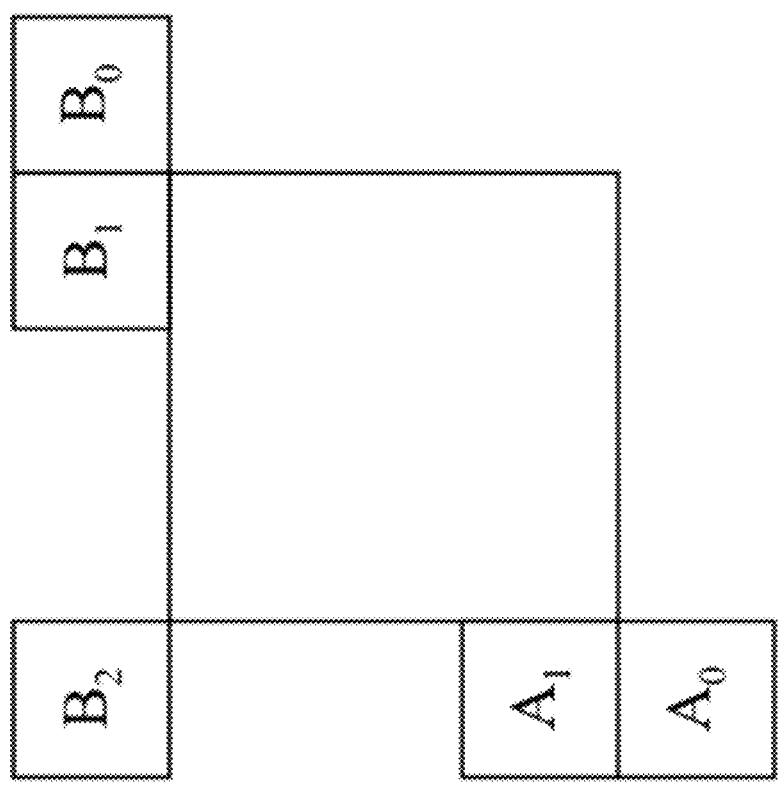
FIG. 2 shows an example of five spatial neighboring candidates.

JVET-N0843 is adopted to the VVC. In the JVET-N0843. the BV predictors for merge mode and AMVP mode in IBC will share a common predictor list, which consist of the following elements:
   2 spatial neighboring positions (A1, B1 as in FIG. 2)
   5 HMVP entries
   Zero vectors by default For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.3.2 IBC Advanced Motion Vector Predication (AMVP) Mode

In IBC AMVP mode, an AMVP index point to an entry in the IBC AMVP list is parsed from the bitstream. The construction of the IBC AMVP list can be summarized according to the following sequence of steps:
   Step 1: Derivation of spatial candidates
      Check A0, A1 until an available candidate is found.
      Check B0, B1, B2 until an available candidate is found.
   Step 2: Insertion of HMVP candidates
   Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.
   1) The chroma block will be first partitioned into (N>>1)* (M>>1) sub blocks.
   2) Each sub block with a top left sample coordinated at (x, y) fetches the corresponding luma block covering the same top-left sample which is coordinated at (2x, 2y).
   3) The encoder checks the block vector (bv) of the fetched luma block. If one of the following conditions is satisfied, the by is considered as invalid.
      a. A by of the corresponding luma block is not existing.
      b. The prediction block identified by a by is not reconstructed yet.
      c. The prediction block identified by a by is partially or fully overlapped with the current block.
   4) The chroma motion vector of a sub block is set to the motion vector of the corresponding luma sub block.

The IBC mode is allowed at the encoder when all sub blocks find a valid by.

The decoding process of an IBC block is listed below. The part related to chroma mv derivation in a IBC mode is highlighted as underlined italicized text.

8.6.1 General Decoding Process for Coding Units Coded in IBC Prediction

Inputs to this process are:
   a luma location (xCb, yCb) specifying the top-left sample of the current coding block relative to the top-left luma sample of the current picture,
   a variable cbWidth specifying the width of the current coding block in luma samples,
   a variable cbHeight specifying the height of the current coding block in luma samples,
   a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in ibc prediction mode consists of the following ordered steps:
1. The motion vector components of the current coding unit are derived as follows:
    1. If treeType is equal to SINGLE_TREE or DUAL_TREE_LUMA, the following applies:
        The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
        When treeType is equal to SINGLE_TREE, the derivation process for chroma motion vectors in clause 8.6.2.9 is invoked with luma motion vector mvL[0][0] as input, and chroma motion vector mvC[0][0] as output.
        The number of luma coding subblocks in horizontal direction numSbX and in vertical direction numSbY are both set equal to 1.
    1. Otherwise, if treeType is equal to DUAL_TREE_CHROMA, the following applies:
        The number of luma coding subblocks in horizontal direction numSbX and in vertical direction numSbY are derived as follows:

numSbX=(cbWidth>>2)                                              (8-886)

numSbY=(cbHeight>>2)                                             (8-887)

The chroma motion vectors mvC[xSbIdx][ySbIdx] are derived as follows for xSbIdx=0 . . . numSbX−1, ySbIdx=0 . . . numSbY−1:
    The luma motion vector mvL[xSbIdx][ySbIdx] is derived as follows:
        The location (xCuY, yCuY) of the collocated luma coding unit is derived as follows:

xCuY=xCb+xSbIdx*4                                                (8-888)

yCuY=yCb+ySbIdx*4                                                (8-889)

If CuPredMode[xCuY][yCuY] is equal to MODE_INTRA, the following applies.

mvL[xSbIdx][ySbIdx][0]=0                                         (8-890)

mvL[xSbIdx][ySbIdx][1]=0                                         (8-891)

predFlagL0[xSbIdx][ySbIdx]=0                                     (8-892)

predFlagL1[xSbIdx][ySbIdx]=0                                     (8-893)

Otherwise (CuPredMode[xCuY][yCuY] is equal to MODE_IBC), the following applies:

mvL[xSbIdx][ySbIdx][0]=MvL0[xCuY][yCuY][0]                       (8-894)

mvL[xSbIdx][ySbIdx][1]=MvL0[xCuY][yCuY][1]                       (8-895)

predFlagL0[xSbIdx][ySbIdx]=1                                     (8-896)

predFlagL1[xSbIdx][ySbIdx]=0                                     (8-897)

The derivation process for chroma motion vectors in clause 8.6.2.9 is invoked with mvL[xSbIdx][ySbIdx] as inputs, and mvC[xSbIdx][ySbIdx] as output.
In bitstream conformance, the chroma motion vector mvC[xSbIdx][ySbIdx] may obey the following constraints:
    When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output may be equal to TRUE.
    When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output may be equal to TRUE.
    One or both of the following conditions may be true:

(mvC[xSbIdx][ySbIdx][0]>>5)+xSbIdx*2+2 is less than or equal to 0.

(mvC[xSbIdx][ySbIdx][1]>>5)+ySbIdx*2+2 is less than or equal to 0.

2. The prediction samples of the current coding unit are derived as follows:
    If treeType is equal to SINGLE_TREE or DUAL_TREE_LUMA, the prediction samples of the current coding unit are derived as follows:
        The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamples$_L$ of prediction luma samples as outputs.
    Otherwise if treeType is equal to SINGLE_TREE or DUAL_TREE_CHROMA, the prediction samples of the current coding unit are derived as follows:
        The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array predSamples$_{Cb}$ of prediction chroma samples for the chroma components Cb as outputs.
        The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC [xSbIdx][ySbIdx] with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.

4. The residual samples of the current coding unit are derived as follows:

When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.4 Adaptive Motion Vector Resolution (AMVR)

In HEVC, motion vector differences (MVDs) (between the motion vector and predicted motion vector of a CU) are signaled in units of quarter-luma-sample when use_integer_mv_flag is equal to 0 in the slice header. In VVC, a CU-level adaptive motion vector resolution (AMVR) scheme is introduced. AMVR allows motion vector difference (MVD) of the CU to be coded in different precision. Dependent on the mode (normal AMVP mode or affine AVMP mode) for the current CU, the MVDs of the current CU can be adaptively selected as follows:

Normal AMVP mode: quarter-luma-sample, integer-luma-sample or four-luma-sample.

Affine AMVP mode: quarter-luma-sample, integer-luma-sample or 1/16 luma-sample.

The CU-level MVD resolution indication is conditionally signaled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signaled to indicate whether quarter-luma-sample MVD precision is used for the CU. If the first flag is 0, no further signaling is needed and quarter-luma-sample MVD precision is used for the current CU. Otherwise, a second flag is signaled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check three times for each MVD resolution, in VTM4, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then $1/16$ luma-sample MV precision and 1-pel MV precision affine inter modes are not checked. Furthermore, affine parameters obtained in quarter-luma-sample MV precision affine inter mode is used as starting search point in $1/16$ luma-sample and quarter-luma-sample MV precision affine inter modes.

2.5 Palette Mode in HEVC Screen Content Coding Extensions (HEVC-SCC)

Figure 3:
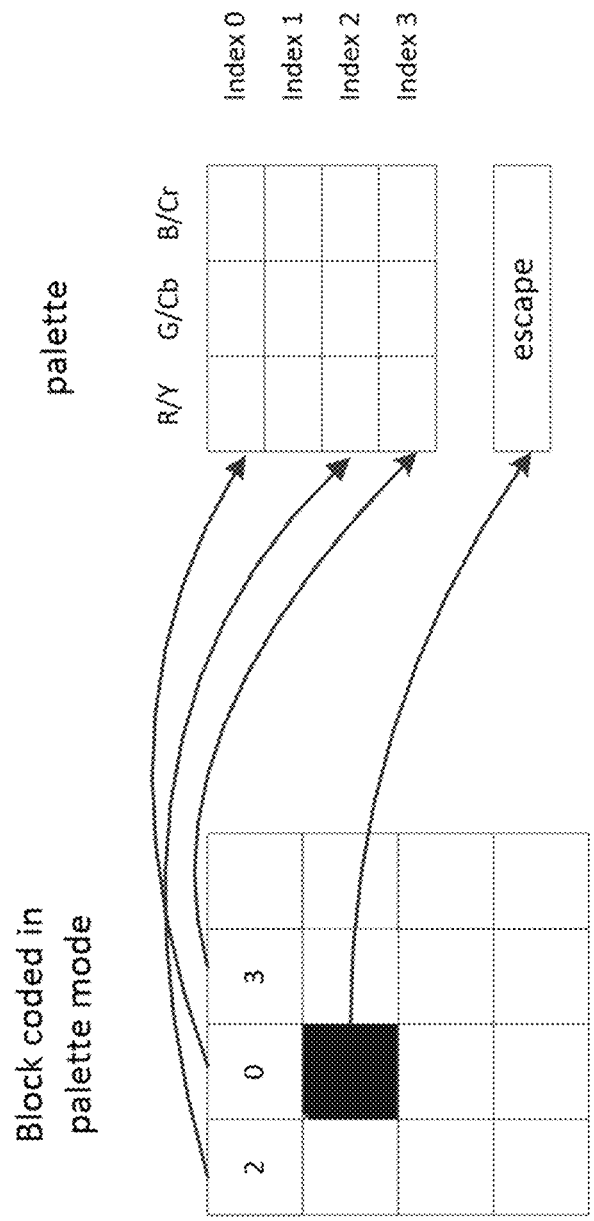
FIG. 3 shows an example of a block coded in palette mode.

The basic idea behind a palette mode is that the samples in the CU are represented by a small set of representative color values. This set is referred to as the palette. It is also possible to indicate a sample that is outside the palette by signaling an escape symbol followed by (possibly quantized) component values. This is illustrated in FIG. 3.

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signaled in the SPS. In HEVC-SCC, a palette_predictor_initializer_present_flag is introduced in the PPS. When this flag is 1, entries for initializing the palette predictor are signaled in the bitstream. The palette predictor is initialized at the beginning of each CTU row, each slice and each tile. Depending on the value of the palette_predictor_initializer_present_flag, the palette predictor is reset to 0 or initialized using the palette predictor initializer entries signaled in the PPS. In HEVC-SCC, a palette predictor initializer of size 0 was enabled to allow explicit disabling of the palette predictor initialization at the PPS level.

Figure 4:
FIG. 4 shows an example of use of a palette predictor to signal palette entries.

For each entry in the palette predictor, a reuse flag is signaled to indicate whether it is part of the current palette. This is illustrated in FIG. 4. The reuse flags are sent using run-length coding of zeros. After this, the number of new palette entries are signaled using exponential Golomb code of order 0. Finally, the component values for the new palette entries are signaled.

2.5.2 Coding of Palette Indices

Figure 5:
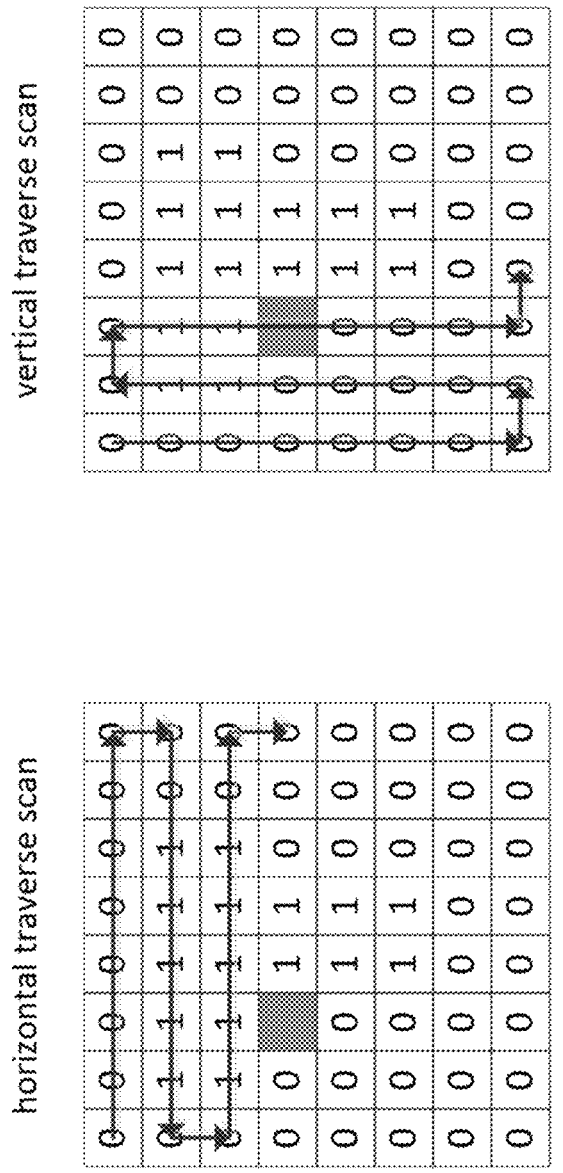
FIG. 5 shows an example of horizontal and vertical traverse scans.

The palette indices are coded using horizontal and vertical traverse scans as shown in FIG. 5. The scan order is explicitly signaled in the bitstream using the palette_transpose_flag. For the rest of the subsection it is assumed that the scan is horizontal.

Figure 6:
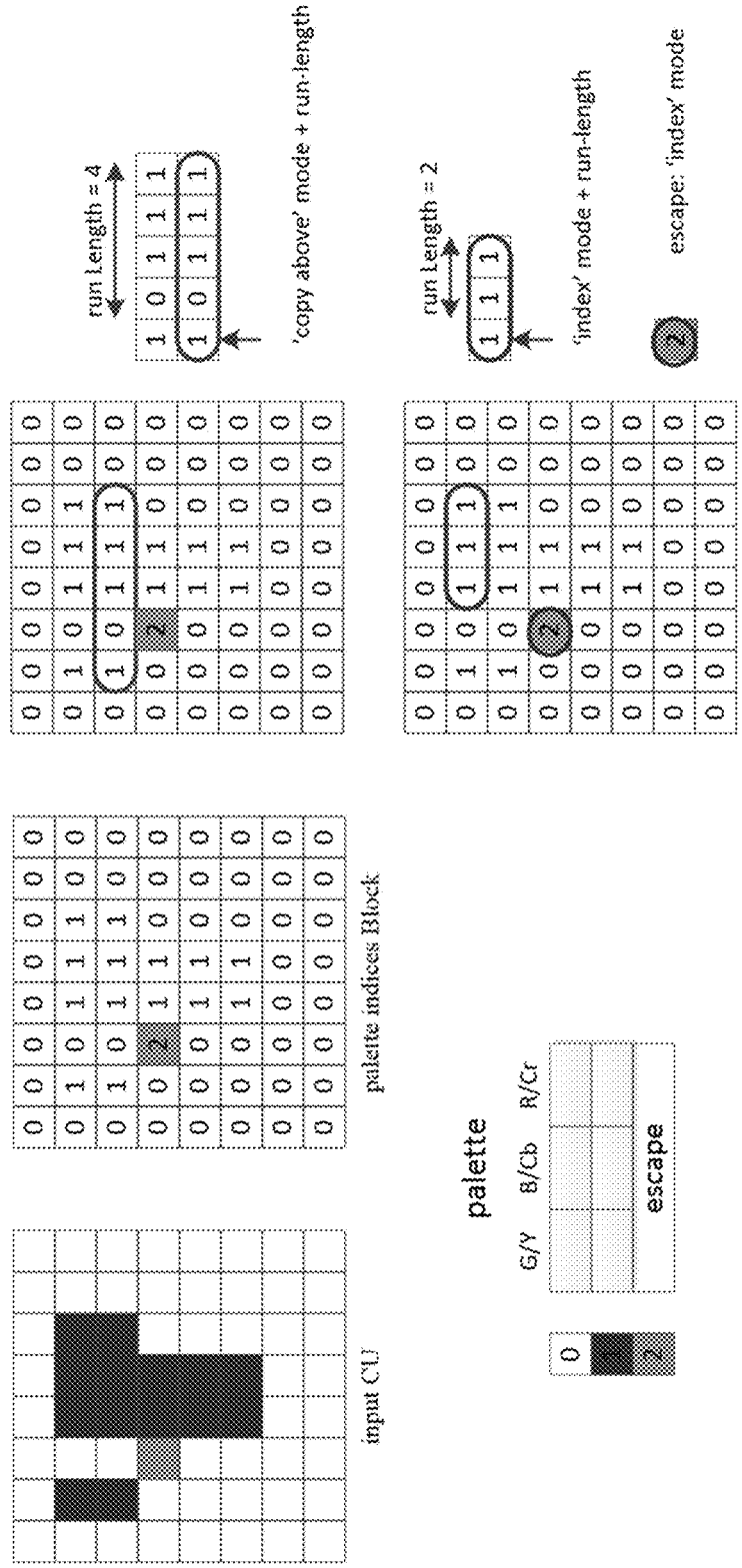
FIG. 6 shows an example of coding of palette indices.

The palette indices are coded using two main palette sample modes: 'INDEX' and 'COPY_ABOVE'. As explained previously, the escape symbol is also signaled as an 'INDEX' mode and assigned an index equal to the maximum palette size. The mode is signaled using a flag except for the top row or when the previous mode was 'COPY_ABOVE'. In the 'COPY_ABOVE' mode, the palette index of the sample in the row above is copied. In the 'INDEX' mode, the palette index is explicitly signaled. For both 'INDEX' and 'COPY_ABOVE' modes, a run value is signaled which specifies the number of subsequent samples that are also coded using the same mode. When escape symbol is part of the run in 'INDEX' or 'COPY_ABOVE' mode, the escape component values are signaled for each escape symbol. The coding of palette indices is illustrated in FIG. 6.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and are run signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

2.6 Coefficients Coding in Transform Skip Mode

In JVET-M0464 and JVET-N0280, several modifications are proposed on the coefficients coding in transform skip (TS) mode in order to adapt the residual coding to the statistics and signal characteristics of the transform skip levels.

The proposed modifications are listed as follows.

No last significant scanning position: Since the residual signal reflects the spatial residual after the prediction and no energy compaction by transform is performed for TS, the higher probability for trailing zeros or insignificant levels at the bottom right corner of the transform block is not given anymore. Thus, last significant scanning position signaling is omitted in this case.

Subblock CBFs: The absence of the last significant scanning position signaling may use the subblock CBF signaling with coded_sub_block_flag for TS to be modified as follows:

Due to quantization, the aforementioned sequence of insignificance may still occur locally inside a transform block. Thus, the last significant scanning position is removed as described before and coded_sub_block_flag is coded for all sub-blocks.

The coded_sub_block_flag for the subblock covering the DC frequency position (top-left subblock) presents a special case. In VVC Draft 3, the coded_sub_block_flag for this subblock is never signaled and always inferred to be equal to 1. When the last significant scanning position is located in another subblock, it means that there is at least one significant level outside the DC subblock. Consequently, the DC subblock may contain only zero/non-significant levels although the coded_sub_block_flag for this subblock is inferred to be equal to 1. With the absence of the last scanning position information in TS, the coded_sub_block_flag for each subblock is signaled. This also includes the coded_sub_block_flag for the DC subblock except when all other coded_sub_block_flag syntax elements are already equal to 0. In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0.

The context modeling for coded_sub_block_flag is changed. The context model index is calculated as the sum of the coded_sub_block_flag to the left and the coded_sub_block_flag above the current subblock instead of and a logical disjunction of both.

sig_coeff_flag context modelling: The local template in sig_coeff_flag context modeling is modified to only include the neighbor to the left ($NB_0$) and the neighbor above ($NB_1$) the current scanning position. The context model offset is just the number of significant neighboring positions sig_coeff_flag[$NB_0$]+sig_coeff_flag[$NB_1$]. Hence, the selection of different context sets depending on the diagonal d within the current transform block is removed. This results in three context models and a single context model set for coding the sig_coeff_flag flag.

abs_level_gt1_flag and par_level_flag context modelling: a single context model is employed for abs_level_gt1_flag and par_level_flag.

abs_remainder coding: Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. This motivates the following modifications of the abs_remainder syntax binarization and context modelling:

Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g. introducing abs_level_gt5_flag, abs_level_gt7_flag, and so on until a cutoff is reached. The cutoff itself is fixed to 5 (numGtFlags=5).

The template for the rice parameter derivation is modified, i.e., only the neighbor to the left and the neighbor above the current scanning position are considered similar to the local template for sig_coeff_flag context modeling.

coeff_sign_flag context modelling: Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

2.7 Quantized Residual Block Differential Pulse-code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block differential pulse coding modulation (DPCM) is applied to the quantized residual samples, resulting in modified M×N array R with elements $\tilde{r}_{i,j}$. When vertical BDPCM is signaled:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{i} \tilde{r}_{k,j}, 0 \leq i \leq (M-1), 0 \leq j \leq (N-1).$$

For horizontal case, $$Q(r_{i,j}) = \Sigma_{k=0}^{j} \tilde{r}_{i,k}, 0 \leq i \leq (M-1), 0 \leq j \leq (N-1).$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply by adding the predictor as the coefficients are parsed or it can be performed after parsing.

The draft text changes of QR-BDPCM are shown as follows.

7.3.6.5 Coding Unit Syntax

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA | |
| ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( pred_mode_flag = = MODE_INTRA && (cIdx == 0 ) && | |
|       ( cbWidth <= 32 ) && ( CbHeight <= 32 ) ) { | |
|       bdpcm_flag[ x0 ][ y0 ] | ae(v) |
|       if( bdpcm_flag[ x0 ][ y0 ] ) { | |
|         bdpcm_dir_flag[ x0 ][ y0 ] | ae(v) |
|       } | |
|       else { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType ) | |
|     } else { | |
|       if( treeType = = SINGLE_TREE \|\| treeType = = | |
| DUAL_TREE_LUMA ) { | |
|         if( ( y0 % CtbSizeY ) > 0 ) | |
|           intra_luma_ref_idx[ x0 ][ y0 ] | ae(v) |
|         if( intra_luma_ref_idx[ x0 ][ y0 ] = = 0 && | |
|           ( cbWidth <= MaxTbSizeY cbHeight <= MaxTbSizeY ) && | |
|           ( cbWidth * cbHeight > MinTbSizeY * MinTbSizeY ) ) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|     } | |
|     if( treeType = = SINGLE_TREE \|\| treeType = = | |
| DUAL_TREE_CHROMA ) | |
|       intra_chroma_pred_mode[ x0 ][ y0 ] | ae(v) |
|   } | |
|   } else if( treeType != DUAL_TREE_CHROMA ) { /* MODE_INTER or | |
| MODE_IBC */ | |
|   ... | |
| } | | bdpcm_flag[x0][y0] equal to 1 specifies that a bdpcm_dir_flag is present in the coding unit including the luma coding block at the location (x0, y0)

bdpcm_dir_flag[x0][y0] equal to 0 specifies that the prediction direction to be used in a bdpcm block is horizontal, otherwise it is vertical.

2.8 Multiple Transform Set (MTS) in VVC

2.8.1 Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/DST7. The newly introduced transform matrices are discrete sine transform (DST)-VII and DCT-VIII. The Table 4 below shows the basis functions of the selected DST/DCT.

TABLE 4

Basis functions of transform matrices used in VVC

| Transform Type | Basis function Ti(j), i, j = 0, 1, . . . , N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+2}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at sequence parameter set (SPS) level for intra and inter, respectively. When MTS is enabled at SPS, a coding unit (CU) level flag is signaled to indicate whether MTS is applied or not. Here, MTS is applied only for luma. The MTS CU level flag is signaled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signaled to indicate the transform type for the horizontal and vertical directions, respectively. Transform and signaling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.8.1.1 Transform Skip (TS) Mode

As title, transform skip mode is to directly quantize a residual block without the transform process. In HEVC version 1, it only applied on 4×4 TU. In the current VVC, it could be applied on a TU under a block size limitation. Furthermore, it is unified into a mode candidate of MTS. The transform skip is applied when MTS index is equal to 1. Below is the draft text related to the TS mode. The TS part is highlighted as underlined italicized text.

7.3.2.4 Picture Parameter Set RBSP Syntax

| | Descriptor |
|---|---|
| pic_parameter_set_rbsp( ) { | |
|   pps_pic_parameter_set_id | ue (v) |
|   pps_seq_parameter_set_id | ue (v) |
|   output_flag_present_flag | u (1) |
|   ... | |
|   transform_skip_enabled_flag | tu (1) |
|   if( transform_skip_enabled_flag ) | |
|     log2_transform_skip_max_size_minus2 | ue (v) |
|   cu_qp_delta_enabled_flag | u (1) |
|   if( cu_qp_delta_enabled_flag ) | |
|     cu_qp_delta_subdiv | ue (v) |
|   ... | |
| } | |

7.3.7.10 Transform Unit Syntax

| | Descriptor |
|---|---|
| transform_unit( x0, y0, tbWidth, tbHeight, treeType, subTuIndex ) { | |
|   ... | |
|   if( ( tu_cbf_luma[ x0 ][ y0 ] || tu_cbf_cb[ x0 ][ y0 ] || tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae (v) |
|       if( cu_qp_delta_abs ) | |
|         cu_qp_delta_sign_flag | ae (v) |
|     } | |
|   } | |
|   if( tu_cbf_luma[ x0 ][ y0 ] && treeType != DUAL_TREE_CHROMA | |
|     && ( tbWidth <= 32 ) && ( tbHeight <= 32 ) | |

-continued

| | Descriptor |
|---|---|
|     && ( IntraSubPartitionsSplit[ x0 ][ y0 ] = = ISP_NO_SPLIT )<br>&& (icu_sbt_flag ) ) {<br>      if( transform_skip_enabled_flag && tbWidth <= MaxTsSize && tbHeight<br><= MaxTsSize )<br>        transform_skip_flag[ x0 ][ y0 ]<br>      if( (( CuPredMode[ x0 ][ y0 ] != MODE_INTRA &&<br>sps_explicit_mts_inter_enabled_flag )<br>        ‖ ( CuPredMode[ x0 ][ y0 ] = = MODE_INTRA &&<br>sps_explicit_mts_intra_enabled_flag ) )<br>        && ( !transform_skip_flag[ x0 ][ y0 ] ) )<br>        tu_mts_idx[ x0 ][ y0 ]<br>    }<br>  ...<br>} | <br><br><br><br>ae (v)<br><br><br><br><br><br>ae (v) | transform_skip_enabled_flag equal to 1 specifies that transform_skip_flag may be present in the transform unit syntax. transform_skip_enabled_flag equal to 0 specifies that transform_skip_flag is not present in the transform unit syntax. log 2_transform_skip_max_size_minus2 specifies the maximum block size used for transform skip, and may be in the range of 0 to 3.

transform_skip_flag[x0][y0] specifies whether a transform is applied to the luma transform block or not. The array indices x0, y0 specify the location (x0, y0) of the top-left luma sample of the considered transform block relative to the top-left luma sample of the picture. transform_skip_flag [x0][y0] equal to 1 specifies that no transform is applied to the luma transform block. transform_skip_flag[x0][y0] equal to 0 specifies that the decision whether transform is applied to the luma transform block or not depends on other syntax elements. When transform_skip_flag[x0][y0] is not present, it is inferred to be equal to 0.

8.7.2 Scaling and Transformation Process

Inputs to this process are:
- a luma location (xTbY, yTbY) specifying the top-left sample of the current luma transform block relative to the top-left luma sample of the current picture,
- a variable cIdx specifying the colour component of the current block,
- a variable nTbW specifying the transform block width,
- a variable nTbH specifying the transform block height.

Output of this process is the (nTbW)×(nTbH) array of residual samples resSamples[x][y] with x=0 . . . nTbW−1, y=0 . . . nTbH−1.

The variables bitDepth, bdShift and tsShift are derived as follows:

$$bitDepth=(cIdx==0)?BitDepth_Y:BitDepth_C \qquad (8\text{-}945)$$

$$bdShift=\text{Max}(20-bitDepth,0) \qquad (8\text{-}946)$$

$$tsShift=5+((\text{Log 2}(nTbW)+\text{Log 2}(nTbH))/2) \qquad (8\text{-}947)$$

The (nTbW)×(nTbH) array of residual samples resSamples is derived as follows:
1. The scaling process for transform coefficients as specified in clause 8.7.3 is invoked with the transform block location (xTbY, yTbY), the transform block width nTbW and the transform block height nTbH, the colour component variable cIdx and the bit depth of the current colour component bitDepth as inputs, and the output is an (nTbW)×(nTbH) array of scaled transform coefficients d.
2. The (nTbW)×(nTbH) array of residual samples r is derived as follows:
    If transform_skip_flag[xTbY][yTbY] is equal to 1 and cIdx is equal to 0, the residual sample array values r[x][y] with x=0 . . . nTbW−1,y=0 . . . nTbH−1 are derived as follows: r[x][y]= d[x][y]<<tsShift  (8-948)

Otherwise (transform_skip_flag[xTbY][yTbY] is equal to 0 or and cIdx is not equal to 0), the transformation process for scaled transform coefficients as specified in clause 8.7.4.1 is invoked with the transform block location (xTbY, yTbY), the transform block width nTbW and the transform block height nTbH, the colour component variable cIdx and the (nTbW)× (nTbH) array of scaled transform coefficients d as inputs, and the output is an (nTbW)×(nTbH) array of residual samples r.
3. The residual samples resSamples[x][y] with x=0 . . . nTbW−1, y=0 . . . nTbH−1 are derived as follows:

$$resSamples[x][y]=(r[x][y]+(1<<(bdShift-1)))>>bdShift \qquad (8\text{-}949)$$

2.8.2 Reduced Secondary Transform (RST) Proposed in JVET-N0193

2.8.2.1 Non-Separable Secondary Transform (NSST) in JEM

Figure 7:
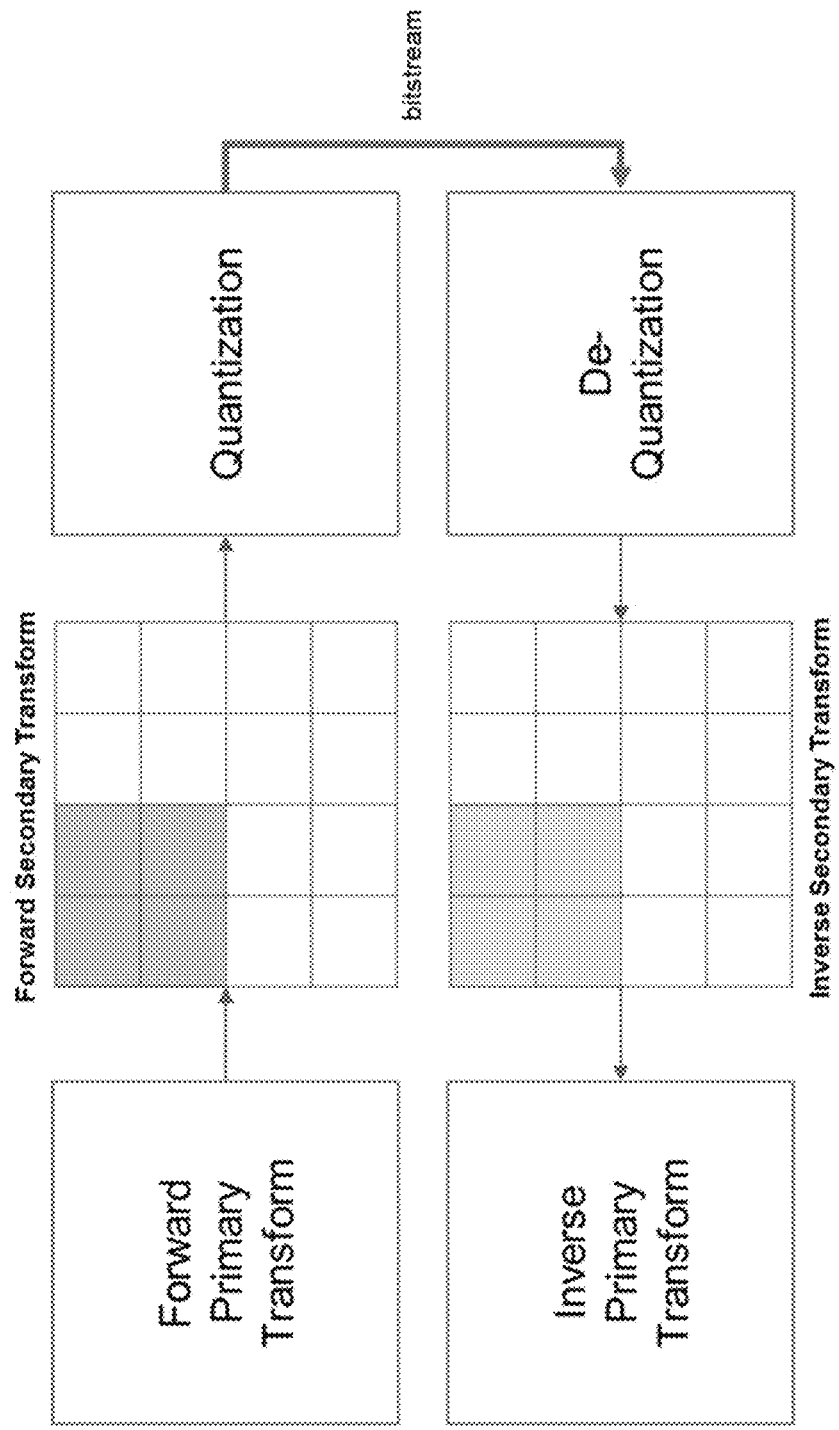
FIG. 7 shows an example of a secondary transform in Joint Exploration Model (JEM).

In JEM, secondary transform is applied between forward primary transform and quantization (at encoder) and between de-quantization and invert primary transform (at decoder side). As shown in FIG. 7, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector F is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signaled secondary transform index. The index is signaled in a bit-stream once per Intra CU after transform coefficients.

2.8.2.2 Reduced Secondary Transform (RST) in JVET-N0193

Figure 8:
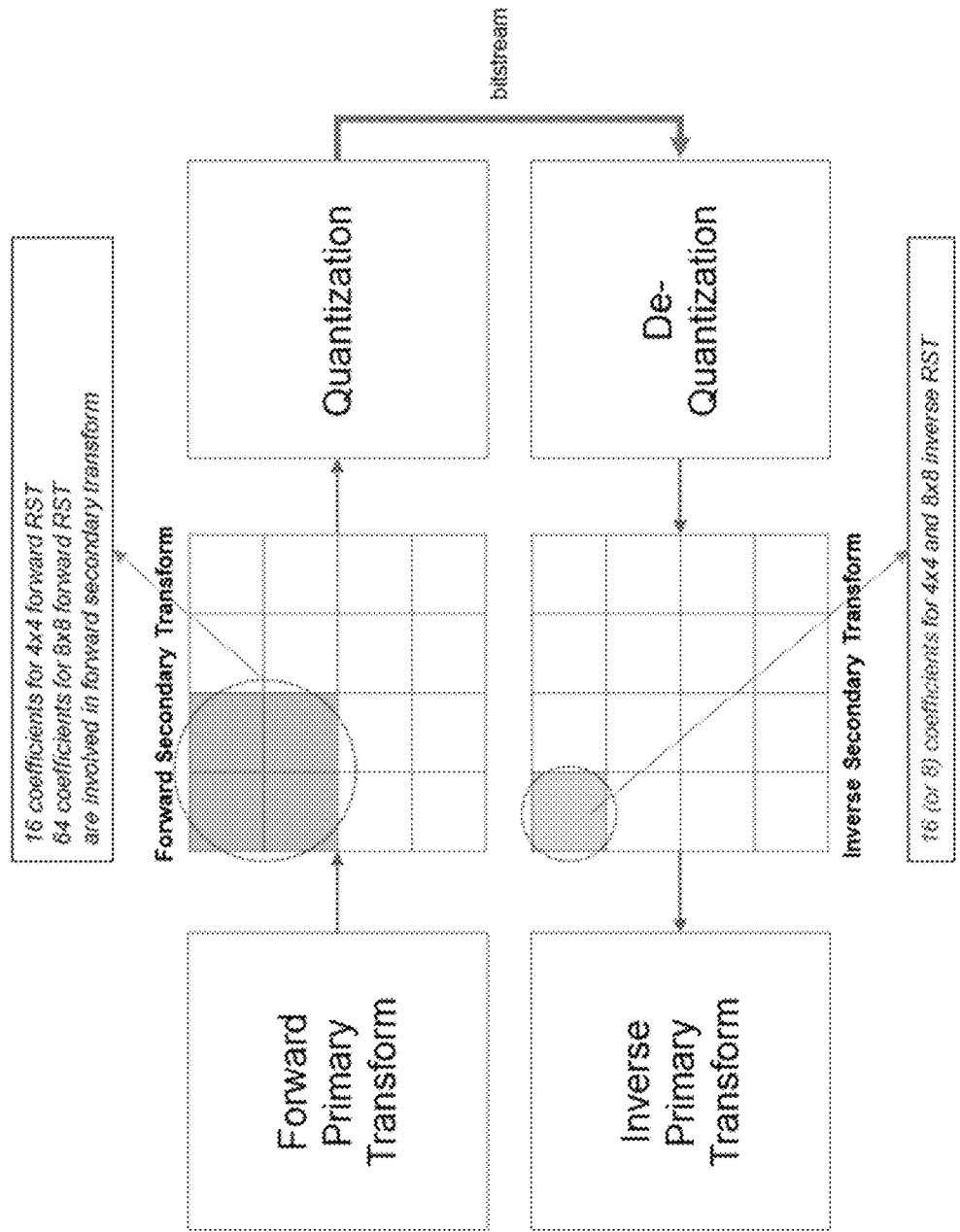
FIG. 8 shows an example of the reduced secondary transform (RST).

The RST (a.k.a. Low Frequency Non-Separable Transform (LFNST)) was introduced in JVET-K0099 and 4 transform sets (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 8 shows an example of RST.

2.8.2.2.1 RST Computation

Figure 9:
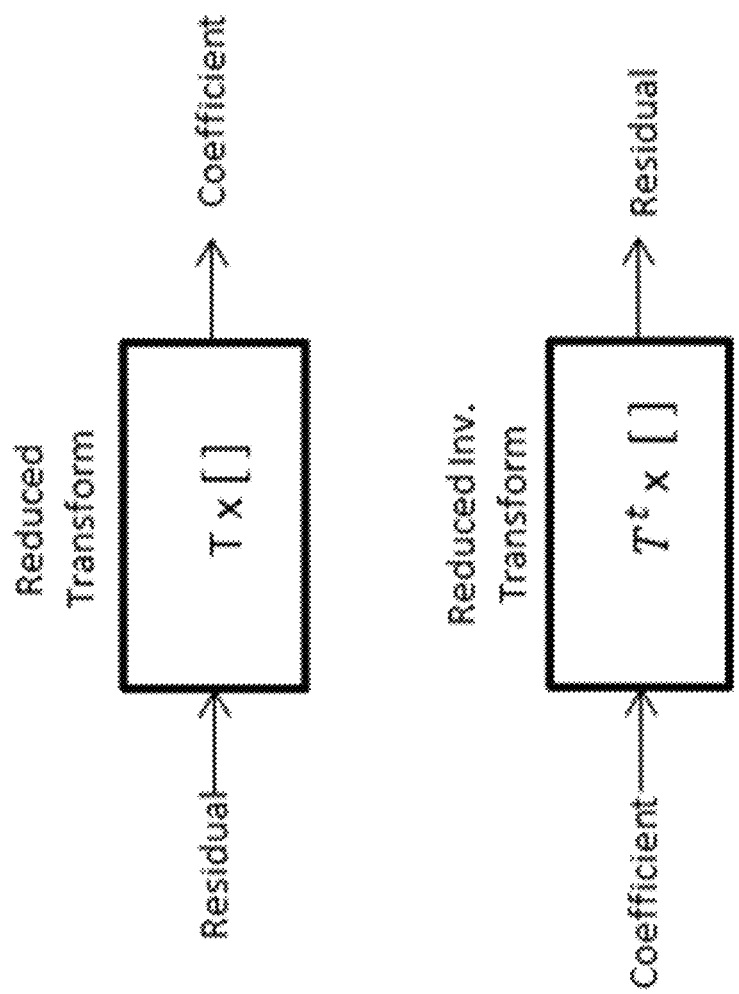
FIG. 9 shows examples of the forward and inverse reduced transforms.

The main idea of a Reduced Transform (RT) is to map an N dimensional vector to an R dimensional vector in a different space, where R/N (R<N) is the reduction factor.
The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 9.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)
Transform skip mode flag is equal to zero
If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.8.2.2.2 Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.8.2.2.3 RST Selection

A RST matrix is chosen from four transform sets, each of which consists of two transforms. Which transform set is applied is determined from intra prediction mode as the following:

(1) If one of three CCLM modes is indicated, transform set 0 is selected.
(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the above table, denoted as IntraPredMode, have a range of [−14, 83], which is a transformed mode index used for wide angle intra prediction.

2.8.2.2.4 RST Matrices of Reduced Dimension

Figure 10:
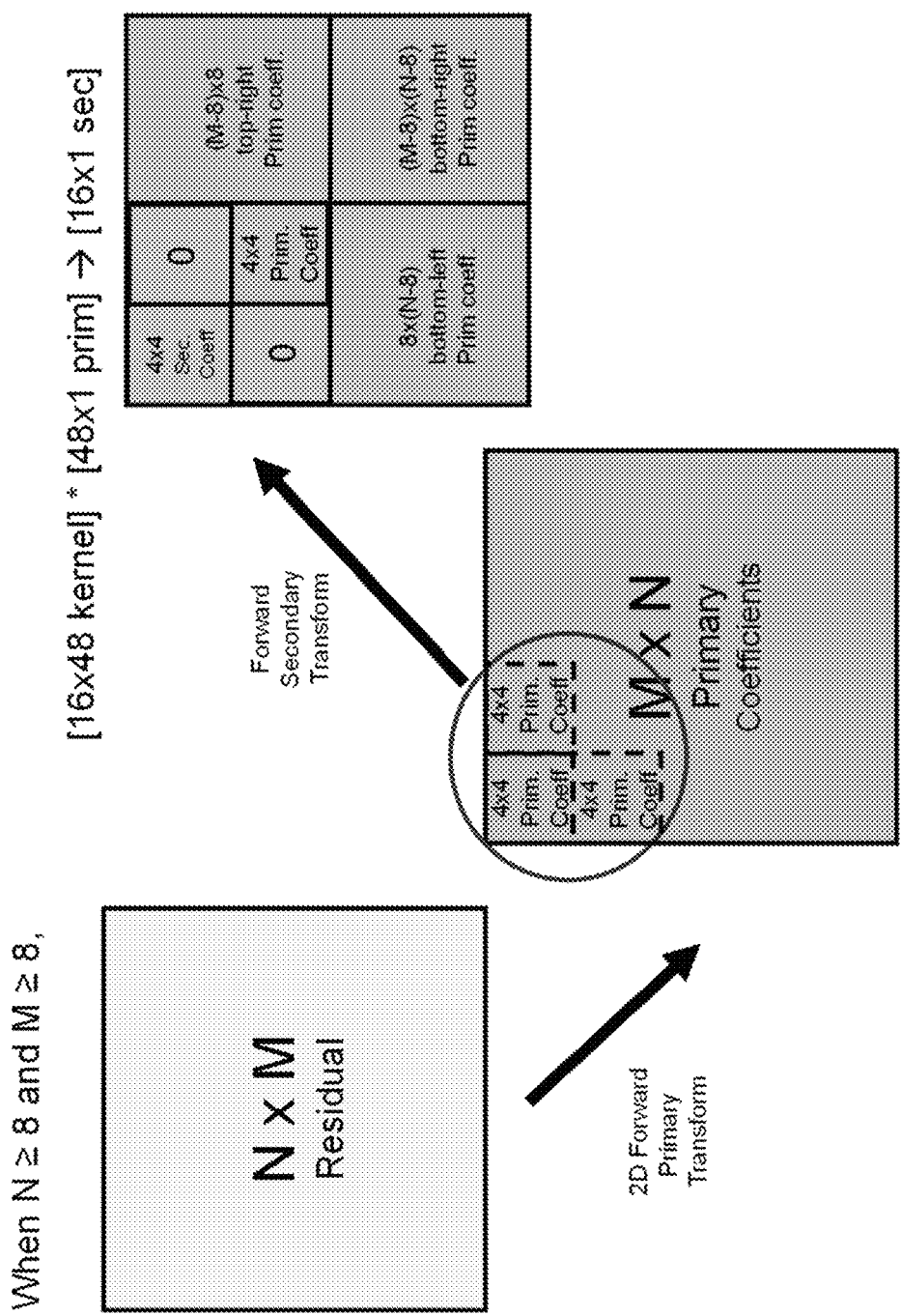
FIG. 10 shows an example of a forward 8×8 RST process with a 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 10).

2.8.2.2.5 RST Signaling

Figure 11:
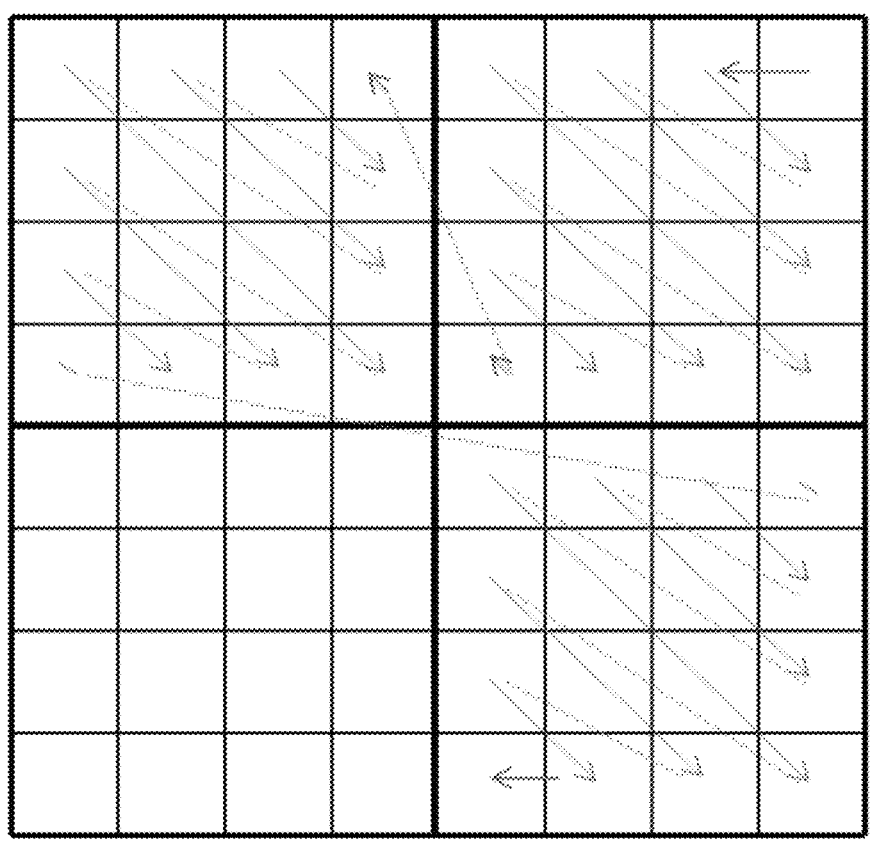
FIG. 11 shows an example of scanning positions 17 through 64 in an 8×8 block for a non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 11) because it implies that RST was not applied. In such a case, RST index is inferred to be zero.

2.8.2.2.6 Zero-Out Region within One CG

Usually, before applying the invert RST on a 4×4 sub-block, any coefficient in the 4×4 sub-block may be non-zero. However, it is constrained that in some cases, some coefficients in the 4×4 sub-block may be zero before invert RST is applied on the sub-block.

Let nonZeroSize be a variable. Any coefficient with the index no smaller than nonZeroSize when it is rearranged into a 1-D array before the invert RST may be zero.

When nonZeroSize is equal to 16, there is no zero-out constrain on the coefficients in the top-left 4×4 sub-block.

In JVET-N0193, when the current block size is 4×4 or 8×8, nonZeroSize is set equal to 8 (that is, coefficients with the scanning index in the range [8, 15] as show in FIG. 11, may be 0). For other block dimensions, nonZeroSize is set equal to 16.

2.8.2.2.7 Description of RST in Working Draft

7.3.2.3 Sequence Parameter Set RBSP Syntax

|  | Descriptor |
|---|---|
| seq_parameter_set_rbsp( ) { |  |
| ... |  |
| sps_mts_enabled_flag | u (1) |
| if( sps_mts_enabled_flag ) { |  |
|    sps_explicit_mts_intra_enabled_flag | u (1) |
|    sps_explicit_mts_inter_enabled_flag | u (1) |
| } |  |
| ... |  |
| sps_st_enabled_flag | u (1) |
| ... |  |
| } |  |

7.3.7.11 Residual Coding Syntax

|  | Descriptor |
|---|---|
| residual_coding( x0, y0, log2TbWidth, log2TbHeight, cIdx ) { |  |
| ... |  |
|   if( coded_sub_block_flag[ xS ][ yS ] && ( n > 0 \|\| !inferSbDcSigCoeffFlag ) && |  |
|     ( xC != LastSignificantCoeffX \|\| yC != Last SignificantCoeffY ) ) |  |
|   { |  |
|     sig_coeff_flag[ xC ][ yC ] | ae (v) |
|     remBinsPass1- - |  |
|     if( sig_coeff_flag[ xC ][ yC ] ) |  |
|       inferSbDcSigCoeffFlag = 0 |  |
|   } |  |
|   if( !sig_coeff_flag[ xC ][ yC ] ) { |  |
|     if( !transform_skip_flag[ x0 ][ y0 ] ) { |  |
|     numSigCoeff+ + |  |
|     if( ( ( ( log2TbWidth = = 2 && log2TbHeight = = 2 ) \|\| ( log2TbWidth = = 3 && log2TbHeight = = 3 ) ) && n >= 8 && i = = 0 ) \|\| ( ( log2TbWidth >= 3 && log2TbHeight >= 3 && ( i = = 1 \|\| i == 2 ) ) ) ) |  |
|     { |  |
|       numZeroOutSigCoeff+ + |  |
|     } |  |
|   } |  |
|   abs_level_gt1_flag[ n ] | ae (v) |
| ... |  |

7.3.7.5 Coding Unit Syntax

|  | Descriptor |
|---|---|
| coding_unit( x0, y0, cbWidth, cbHeight, treeType ) { |  |
|   if( !pcm_flag[ x0 ][ y0 ] ) { |  |
|     if( CuPredMode[ x0 ][ y0 ] != MODE_INTRA && merge_flag[ x0 ][ y0 ] = = 0 ) |  |
|       cu_cbf | ae (v) |
|     if( cu_cbf ) { |  |
|       if( CuPredMode[ x0 ][ y0 ] = = MODE_INTER && sps_sbt_enabled_flag && !ciip_flag[ x0 ][ y0 ] ) { |  |
|         if( cbWidth <= MaxSbtSize && cbHeight <= MaxSbtSize ) { |  |
|           allowSbtVerH = cbWidth >= 8 |  |
|           allowSbtVerQ = cbWidth >= 16 |  |
|           allowSbtHorH = cbHeight >= 8 |  |
|           allowSbtHorQ = cbHeight >= 16 |  |
|           if( allowSbtVerH \|\| allowSbtHor \|\| allowSbtVerQ \|\| allowSbtHorQ ) |  |
|             cu_sbt_flag | ae (v) |
|         } |  |
|         if( cu_sbt_flag ) { |  |
|           if( ( allowSbtVerH allowSbtHorH ) && ( allowSbtVerQ allowSbtHorQ ) ) |  |
|             cu_sbt_quad_flag | ae (v) |
|           if( ( cu_sbt_quad_flag && allowSbtVerQ && allowSbtHorQ ) |  |

| | Descriptor |
|---|---|
| ( !cu_sbt_quad_flag && allowSbtVerH && allowSbtHorH ) <br> ) <br>     cu_sbt_horizontal_flag | ae (v) |
|   cu_sbt_pos_flag | ae (v) |
|     } <br>   } <br>   numZeroOutSigCoeff = 0 <br>   transform_tree( x0, y0, cbWidth, cbHeight, treeType ) <br>   if( Min( cbWidth, cbHeight) >= 4 && sps_st_enabled_flag = = 1 <br> && CuPredMode[ x0 ][ y0 ] = = MODE_INTRA <br> && IntraSubPartitionsSplitType = = ISP_NO_SPLIT ) { <br>     if ( numSigCoeff > ( ( treeType = = SINGLE_TREE ) ? 2 : 1 ) ) <br> && <br> numZeroOutSigCoeff = = 0 ) { <br>       st_idx[ x0 ][y0 ] | ae (v) |
|     } <br>   } <br>   } <br>  } <br> } | | sps_st_enabled_flag equal to 1 specifies that st_idx may be present in the residual coding syntax for intra coding units. sps_st_enabled_flag equal to 0 specifies that st_idx is not present in the residual coding syntax for intra coding units.

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

Bins of st_idx are context-coded. More specifically, the following applies:

TABLE 9-9

Syntax elements and associated binarizations

| Syntax structure | Syntax element | Binarization | |
|---|---|---|---|
| | | Process | Input parameters |
| ... | ... | ... | ... |
| | st_idx[ ][ ] | TR | cMax = 2, cRiceParam = 0 |

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| ... | ... | ... | | | | |
| st_idx[ ][ ] | 0, 1, 4, 5 <br> (clause 9.5.4.2.8) | 2, 3, 6, 7 <br> (clause 9.5.4.2.8) | na | na | na | na |
| ... | ... | ... | | | | ... |

9.5.4.2.8 Derivation Process of ctxInc for the Syntax Element st_idx Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode [x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise (cIdx is greater than 0), intraModeCtx is derived as follows:

intraModeCtx=(intra_chroma_pred_mode[x0][y0]>=4)?1:0

The variable mtsCtx is derived as follows:

mtsCtx=(tu_mts_idx[x0][y0]==0 && treeType!=SINGLE_TREE?1:0

The variable ctxInc is derived as follows:

ctxInc=(binIdx<<1)+intraModeCtx+(mtsCtx<<2)

2.8.2.2 Summary of RST Usage

RST may be enabled only when the number of non-zero coefficients in one block is greater than 2 and 1 for single and separate tree, respectively. In addition, the following restrictions of locations of non-zero coefficients for RST applied coding groups (CGs) may be used when RST is enabled.

TABLE 1

Usage of RST

| Block size | RST type | # of CGs that RST applied to | Which CG that RST applied to may have non-zero coeffs | Potential locations of non-zero coeffs in the CGs RST applied to (nonZeroSize relative to one CG) |
|---|---|---|---|---|
| 4 × 4 | RST4 × 4 (16 × 16) | 1 (Top-left 4 × 4) | Top-left 4 × 4 | First 8 in diagonal scan order (0..7 in FIG. 13, nonZeroSize = 8 |
| 4 × 8/8 × 4 | RST4 × 4 (16 × 16) | 1 (Top-left 4 × 4) | Top-left 4 × 4 | all, nonZeroSize = 16 |
| 4 × N and N × 4 (N > 8) | RST4 × 4 (16 × 16) | 2 (4 × N: up most 4 × 8; N × 4: left most 4 × 8) | 4 × N: up most 4 × 8; N × 4: left most 4 × 8 | all, nonZeroSize = 16 |
| 8 × 8 | RST8 × 8 (16 × 48) | 3 (with only 1 CG may have non-zero coeffs after forward RST) | Top-left 4 × 4 | First 8 in diagonal scan order (0..7 in FIG. 13, nonZeroSize = 8 |
| Others (W*H, W > 8, H > 8) | RST8 × 8 (16 × 48) | 3 (with only 1 CG may have non-zero coeffs after forward RST) | Top-left 4 × 4 | all, nonZeroSize = 16 |

2.8.3 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 12:
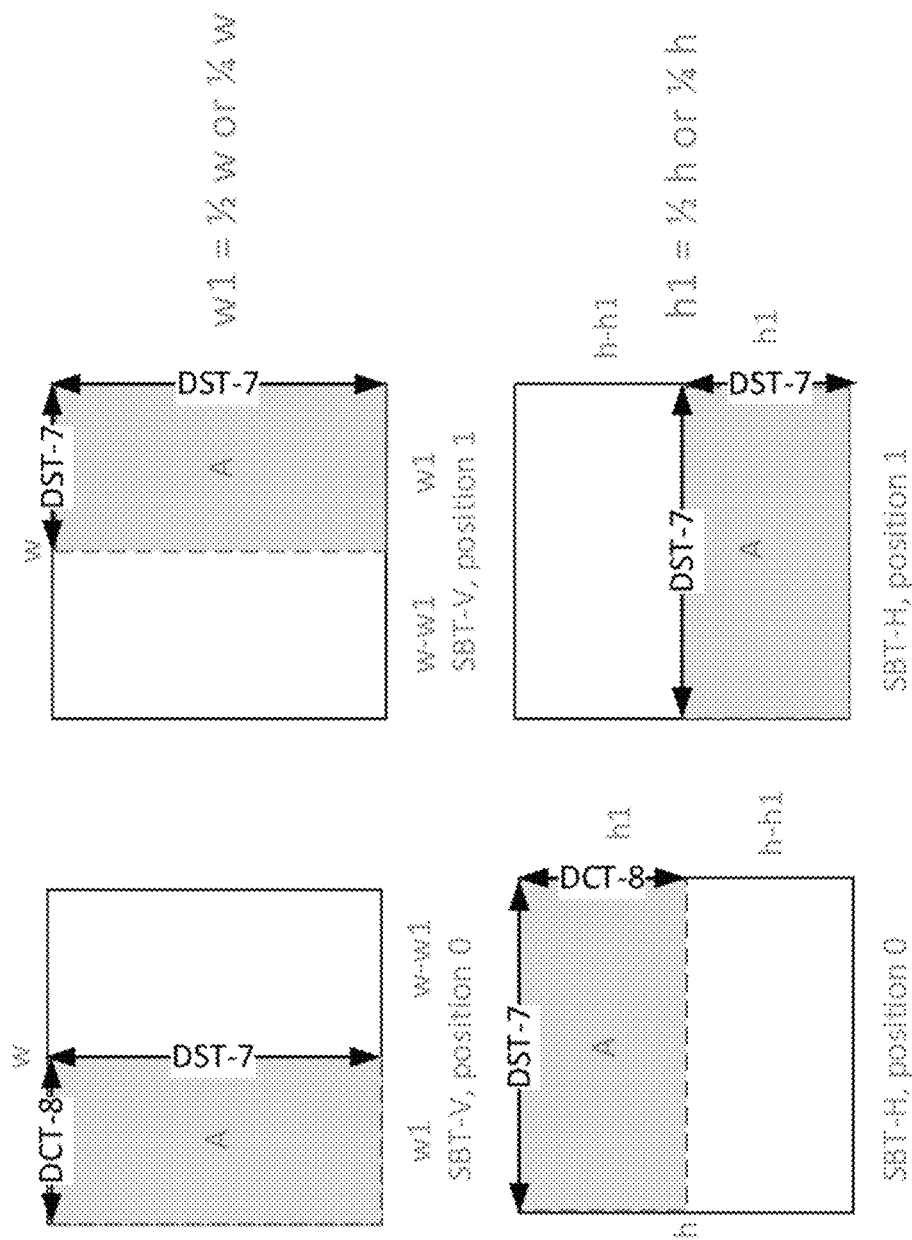
FIG. 12 shows an example of sub-block transform modes sub-block transform (SBT)-V and SBT-H.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 12. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.8.3.1 Syntax Elements 7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae (v) |
|     if( cu_skip_flag[ x0 ][ y0 ] = = 0 && slice_type != I ) | |
|       pred_mode_flag | ae (v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) | |
|   && | |
|     sps_ibc_enabled_flag ) | |
|       pred_mode_ibc_flag | ae (v) |
|   } | |
|   if( CuPredMode[ x0 ][ y0 ] = = MODE_INTRA ) { | |
|     ... | |
|   } else if( treeType != DUAL_TREE_CHROMA ) { /* MODE_INTER or MODE_IBC */ | |
|     ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae (v) |

-continued

| | Descriptor |
|---|---|
| ```
if( cu_cbf ) {
    if( CuPredMode[ x0 ][ y0 ] = = MODE_INTER &&
sps_sbt_enabled_flag &&
        !ciip_flag[ x0 ][ y0 ] ) {
        if( cbWidth <= MaxSbtSize && cbHeight <= MaxSbtSize ) {
            allowSbtVerH = cbWidth >= 8
            allowSbtVerQ = cbWidth >= 16
            allowSbtHorH = cbHeight >= 8
            allowSbtHorQ = cbHeight >= 16
            if( allowSbtVerH || allowSbtHorH || allowSbtVerQ ||
allowSbtHorQ )
                cu_sbt_flag
        }
        if( cu_sbt_flag ) {
            if( ( allowSbtVerH || allowSbtHorH) && ( allowSbtVerQ ||
allow SbtHorQ ) )
                cu_sbt_quad_flag
            if( !cu_sbt_quad_flag && allowSbtVerQ && allowSbtHorQ )
||
                ( !cu_sbt_quad_flag && allowSbtVerH && allowSbtHorH ) )
                cu_sbt_horizontal_flag
            cu_sbt_pos_flag
        }
    }
    transform_tree( x0, y0, cbWidth, cbHeight, treeType )
  }
 }
}
``` | <br><br><br><br><br><br><br><br><br><br>ae (v)<br><br><br><br><br><br>ae (v)<br><br><br><br>ae (v)<br>ae (v) | cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units. When cu_sbt_horizontal_flag is not present, its value is derived as follows:

If cu_sbt_quad_flag is equal to 1, cu_sbt_horizontal_flag is set to be equal to allowSbtHorQ Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTb0 is derived as follows:

$$sbtMinNumFourths=cu\_sbt\_quad\_flag?1:2 \quad (7\text{-}117)$$

$$SbtNumFourthsTb0=cu\_sbt\_pos\_flag?(4-sbtMin\text{-}NumFourths):sbtMinNumFourths \quad (7\text{-}118)$$

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize=sps\_sbt\_max\_size\_64\_flag?64:32 \quad (7\text{-}33)$$

3. Examples of Problems Solved by Embodiments

In VVC, up to 32×32 coefficients may be coded even for a coding unit with size larger than 32×32 to save the computational complexity due to transform. Large blocks usually have a lot of energy on the residue especially for screen contents. How to support large blocks coding without introducing further complexity needs to be studied. In addition, there are other problems in the current design:

(1) Large blocks coded with IBC mode could only employ the DCT2 transform, it may be desirable to support more transform types, including TS.
(2) Small blocks coded with IBC mode only support DCT2 and TS transform, it may be desirable to support more transform types.
(3) Sub-block level transform skip may improve coding efficiency for IBC mode.
(4) The RDPCM is not supported by blocks coded with IBC mode.
(5) How to select contexts in coding large blocks needs further study.

4 Example Methods for Transform Design for Large Blocks

The detailed embodiments below should be considered as examples to explain general concepts. These embodiments should not be interpreted in a narrow way. Furthermore, these embodiments can be combined in any manner.

The following methods are introduced to solve the above-mentioned problems. The terminology 'large block' may represent a block with both width and height greater than 32, or the maximum between width and height of a block is greater than 32.

Figure 14:
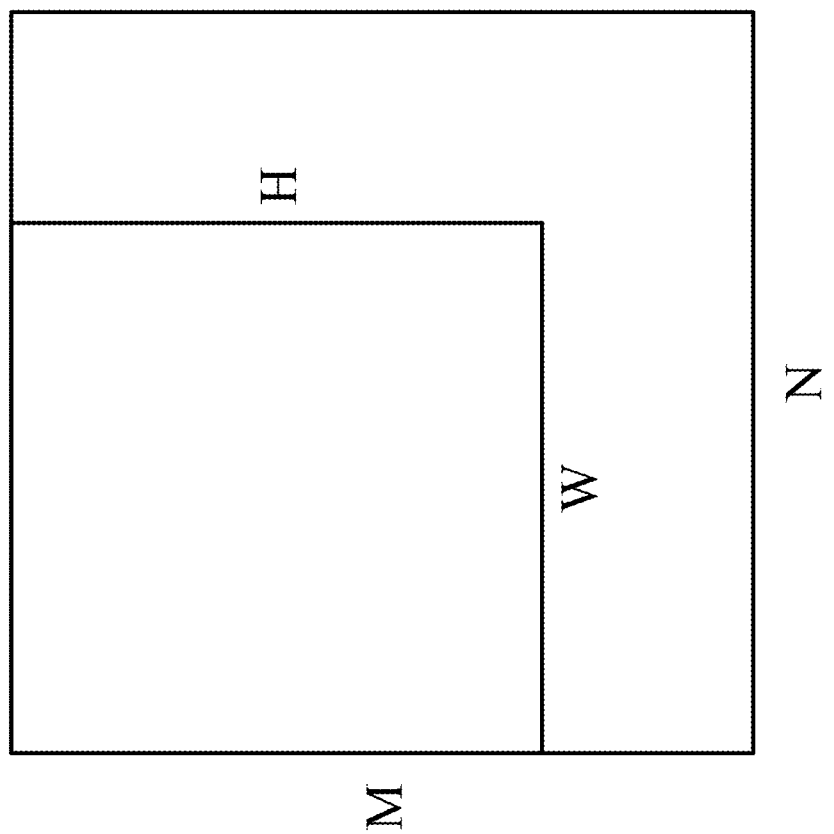
FIG. 14 shows an example of non-uniform downsampling.

1. It is proposed to enable the Transform skip (TS) mode for large blocks.
    a. In one example, the maximum block size used for transform skip is increased from 32 to 64 or 128.
    b. In one example, the range of log 2_transform_skip_max_size_minus2 may be in the range of 0 to 4.
    c. It is restricted that the maximum block size used for transform skip may be not greater than the maximum transform block size.
    d. In one example, the maximum block size used for transform skip is derived from the maximum transform block size.
        i. In one example, the maximum block size used for transform skip is equal to the maximum transform block size.
        ii. Alternatively, the maximum block size used for transform skip is one quarter to the maximum transform block size (e.g., width of the maximum block used for transform skip is set to half of that for the maximum transform block).
        iii. Alternatively, furthermore, indications of the maximum transform block size may be signaled, while the signaling of the maximum block size used for transform skip is removed.
            1) Alternatively, an indication of the ratio between the two maximum block sizes may be signaled.
        iv. Alternatively, predictive coding of maximum block size may be utilized to code that the maximum block size used for transform skip relative to the maximum transform block size.
        v. In one example, QR-BDPCM is treated as a special TS mode. Therefore, the above bullets may be also applicable to the QR-BDPCM mode.
    e. In one example. the above methods may be only applied on a block coded with IBC mode.
        i. In one example, the indication of the usage of TS mode may be signaled on a large block coded with IBC mode instead of being inferred to be false.
        ii. In one example, the indication of the usage of DCT2 transform may be signaled on a large block coded with IBC mode instead of being inferred to be true.
        iii. In one example, a new syntax, e.g. log 2_ibc_transform_skip_max_size_minus2, may be signaled at decoding parameter set (DPS)/SPS/video parameter set (VPS)/picture parameter set (PPS)/adaption parameter set (APS)/picture header/slice header/tile group header/Largest coding unit (LCU)/Coding unit (CU)/LCU row/group of LCUs to indicate the maximum IBC block size to apply TS.
2. It is proposed to avoid transform processes for large blocks.
    a. In one example, the MTS index/RST index are not coded for large blocks.
        i. Alternatively, furthermore, the signaling of side information related to MTS/RST may be skipped.
    b. In one example, only TS mode in terms of residual coding methods is allowed for large blocks.
        i. Alternatively, furthermore, the TS mode flag (e.g., transform_skip_flag) may be inferred to be true.
        ii. Alternative, furthermore, the MTS index (e.g. tu_mts_idx) may be inferred to be 1.
    c. In one example, only the TS mode and QR-BDPCM in terms of residual coding methods may be allowed for large blocks.
3. For transform bypassed (TransBypass)-coded residual blocks, the residual block may be split to multiple regions, and each region is treated as a transform unit.
    a. In one example, suppose the residual block size is K*L, and the i-th region size is KAI, when coding the i-th region, it follows the procedures of coding a $K_i*L_i$ TS-coded block instead of following the procedure of coding a K*L TS-coded block.
    b. In one example, the residual information in a different region may be disallowed to be used for coding the current region (e.g., disallowed for context modeling).
        i. Alternatively, the residual information in a different region may be allowed to be used for coding the current region (e.g., disallowed for context modeling).
    c. How to split the residual block to multiple regions may be dependent on the residual block size.
    d. How to split the residual block to multiple regions may be dependent on coded information (such as mode information, intra prediction direction, etc.).
    e. How to split the residual block to multiple regions may be dependent on the maximum block size to apply TS.
    f. In one example, the context derivation of each region may be dependent or independent.
        i. In one example, the coefficient coding in one region may not take any coefficients in another region to derive the contexts.
        ii. In one example, the coefficient coding in one region may take a coefficient in another region to derive the contexts.
4. For a block to be coded, it may be split to N (N>1) regions, with one region coded without transform applied (or applying identify transform).
    a. In one example, one region is coded without transform applied, and the other regions are not coded.
        i. In one example, the coefficients of other regions are forced to be zero coefficients.
    b. In one example, at least one region is coded without transform applied, and the rest regions are coded with transform applied.
    c. In one example, at least one region is coded without transform applied, at least one region is coded with transform applied, and the rest regions are not coded, e.g., forced to be zero coefficients.
    d. The splitting of the block to multiple regions may follow the way used in the SBT design.
        i. In one example, the splitting may be along the horizontal or vertical direction.
        ii. In one example, the right region may be coded without transform applied and the left region may be forced to be zero coefficients, or vice versa.
        iii. In one example, the bottom region may be coded without transform applied and the top region may be forced to be zero coefficients, or vice versa.
5. For transform bypassed (TransBypass)-coded residual blocks, the residual block may be firstly downsampled, and the downsampled residual block may be coded instead.
    a. In one example, the down sampling method may be a non-uniform down sampling.
        i. In one example, as shown in FIG. 14, only the top-left W×H samples may be kept after the down sampling process. Other samples not in the W×H region may be set to zero.
   b. In one example, the W and/or H in the above method may be determined based on the block size.
   c. In one example, the down sampling method may be a uniform down sampling
6. SBT may be extended to apply identity transform for at least one dimension.
   a. In one example, for one dimension (e.g., horizontal or vertical transform), identity transform may be applied, and for the other dimension, DST-7 may be applied.
   b. In one example, for one dimension (e.g., horizontal or vertical transform), identity transform may be applied, and for the other dimension, DCT-2 may be applied.
   c. In one example, for both dimensions (e.g., horizontal and vertical transform), identity transform may be applied,
7. Whether to and/or how to apply above methods may be based on:
   a. Video contents (e.g. screen contents or natural contents)
      i. In one example, the above methods may be only applied on screen contents.
   b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Block dimension of current block and/or its neighboring blocks
   e. Block shape of current block and/or its neighboring blocks
   f. Prediction mode of the current block
      i. In one example, the above methods may be only applied on a block coded with IBC mode.
   g. The intra mode of the current block and/or its neighboring blocks
   h. The motion/block vectors of the current block and/or its neighboring blocks
   i. Indication of the color format (such as 4:2:0, 4:4:4)
   j. Coding tree structure
   k. Slice/tile group type and/or picture type
   l. Color component (e.g. may be only applied on chroma components or luma component)
   m. Temporal layer ID
   n. Profiles/Levels/Tiers of a standard

5 Exemplary Embodiments of the Disclosed Embodiments

The examples described above may be incorporated in the context of the methods described below, e.g., methods 1500 to 1540 and 2100 to 2800, which may be implemented at a video decoder or a video encoder.

FIG. 15A shows a flowchart of an exemplary method for video processing. The method 1500 includes, at step 1502, making a decision, for a current video block with a height greater than 32 and a width greater than 32, regarding a selective application of a transform-based coding mode on the current video block.

The method 1500 includes, at step 1504, performing, based on the decision, a conversion between the current video block and a bitstream representation of the current video block.

In some embodiments, the transform-based coding mode is a transform skip (TS) mode or a quantized residual block differential pulse-code modulation (QR-BDPCM) mode, and wherein a size of the current video block is 32×32, 32×64, 64×32, 32×128, 128×32, 64×64, 64×128, 128×64 or 128×128. In an example, a maximum block size used in the transform skip mode is not greater than a maximum transform block size. In another example, a maximum block size used in the transform skip mode is based on a maximum transform block size. In yet another example, the maximum block size used in the transform skip mode is equal to the maximum transform block size. In yet another example, the maximum block size used in the transform skip mode is equal to one quarter of the maximum transform block size. In yet another example, an indication of the maximum transform block size is signaled in the bitstream representation, and wherein the bitstream representation excludes an indication of the maximum block size used in the transform skip mode.

In some embodiments, the transform-based coding mode excludes a multiple transform selection (MTS) mode and a reduced secondary transform (RST) mode. In an example, the bitstream representation excludes side information related to the MTS mode and the RST mode.

Figure 15B:
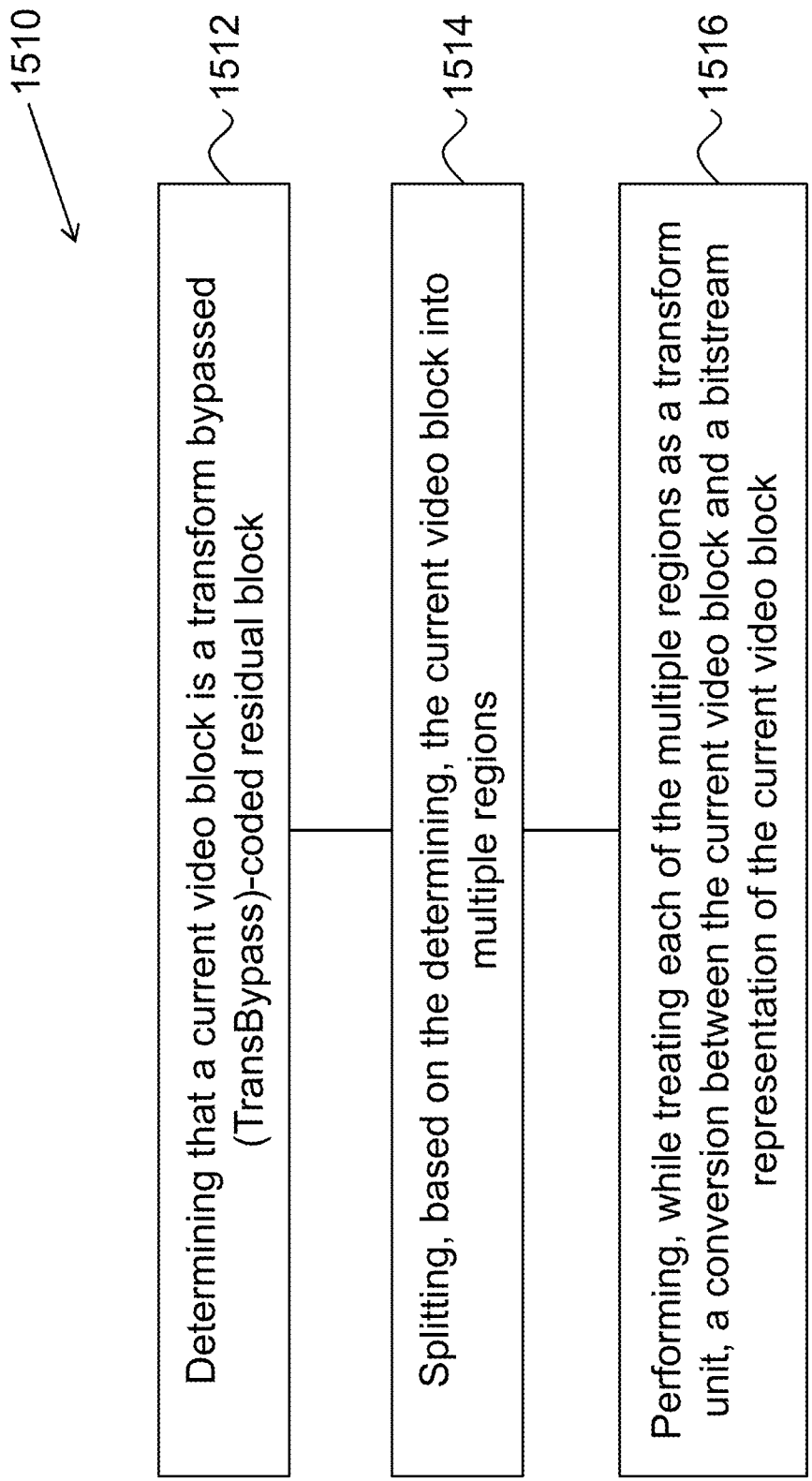

FIG. 15B shows a flowchart of an exemplary method for video processing. The method 1510 includes, at step 1512, determining that a current video block is a transform bypassed (TransBypass)-coded residual block.

The method 1510 includes, at step 1514, splitting, based on the determining, the current video block into multiple regions.

The method 1510 includes, at step 1516, performing, while treating each of the multiple regions as a transform unit, a conversion between the current video block and a bitstream representation of the current video block.

In some embodiments, the splitting is based on at least one of a size, an intra prediction direction or a coding mode of the current video block.

In some embodiments, the splitting is based on a maximum block size for which a transform skip mode can be applied to the current video block.

In some embodiments, a coefficient coding process for deriving a context for a first region of the multiple regions is based on one or more coefficients of a second region of the multiple regions.

In some embodiments, a coefficient coding process for deriving a context for each of the multiple regions is independent of coefficients of another region.

FIG. 15C shows a flowchart of an exemplary method for video processing. The method 1520 includes, at step 1522, splitting a current video block into two or more regions, wherein a first region of the two or more regions is coded without an application of a transform.

The method 1520 includes, at step 1524, performing, based on the splitting, a conversion between the current video block and a bitstream representation of the current video block.

In some embodiments, each of the two or more regions that is different from the first region is not coded. In other embodiments, each of the two or more regions that is different from the first region is coded subsequent to the application of the transform. In an example, the splitting is in a horizontal direction (e.g., the first region is the top region or the first region is the bottom region). In another example, the splitting is in a vertical direction (e.g., the first region is a left region or the first region is a right region).

Figure 15D:
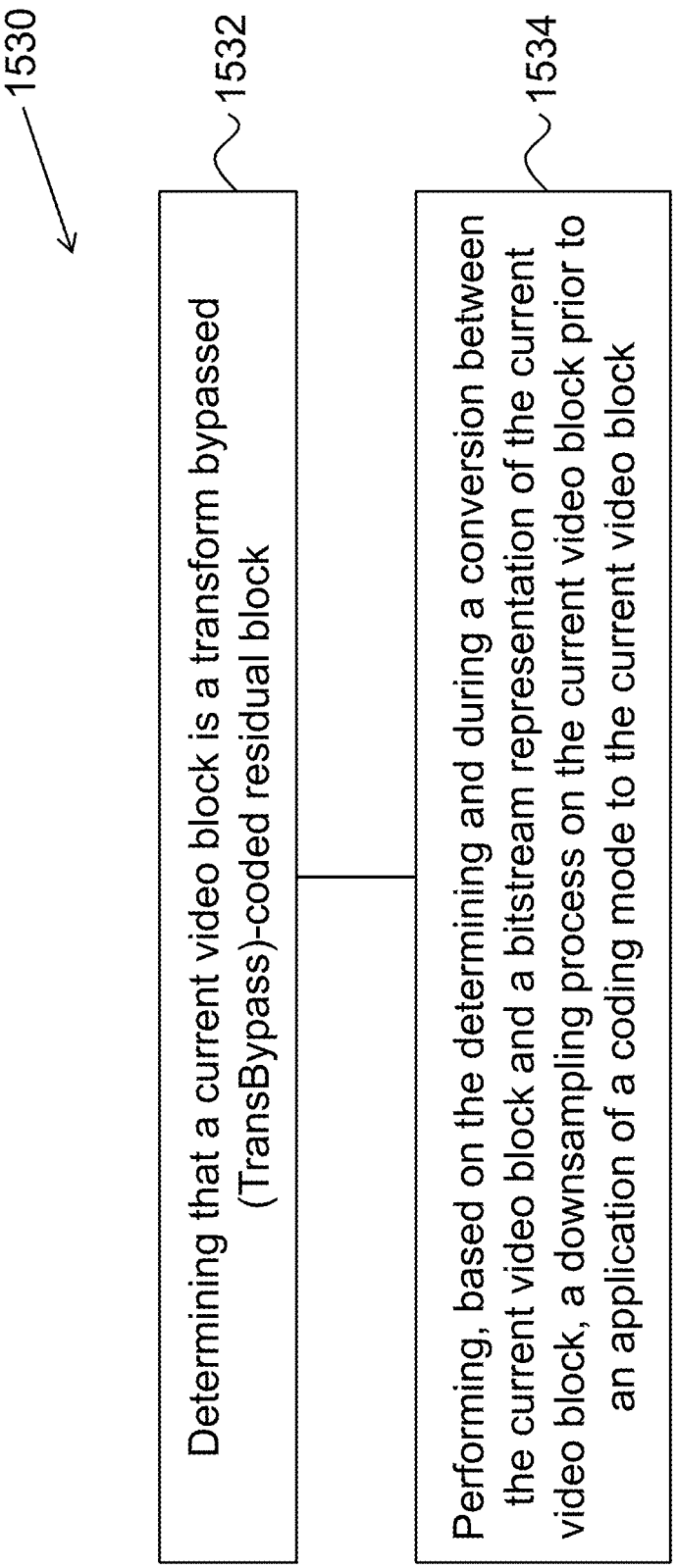

FIG. 15D shows a flowchart of an exemplary method for video processing. The method 1530 includes, at step 1532, determining that a current video block is a transform bypassed (TransBypass)-coded residual block.

The method 1530 includes, at step 1534, performing, based on the determining and during a conversion between the current video block and a bitstream representation of the current video block, a downsampling process on the current video block prior to an application of a coding mode to the current video block.

In some embodiments, the downsampling process comprises a uniform downsampling process. In other embodiments, the downsampling process comprises a non-uniform downsampling process.

FIG. 15E shows a flowchart of an exemplary method for video processing. The method 1540 includes, at step 1542, performing, during a conversion between a current video block and a bitstream representation of the current video block, a sub-block transform (SBT) on the current video block that includes applying an identity transform to at least one dimension.

In some embodiments, the identity transform is applied to a first dimension, and wherein a Discrete Sine Transform of type VII (DST-7) is applied to a second dimension.

In some embodiments, the identity transform is applied to a first dimension, and wherein a Discrete Cosine Transform of type II (DCT-2) is applied to a second dimension.

In some embodiments, the identity transform is applied to a first dimension and a second dimension. In an example, and in the context of method 1540, the first dimension is a horizontal dimension, and the second dimension is a vertical dimension. In another example, the first dimension is a vertical dimension, and the second dimension is a horizontal dimension.

In some embodiments, and in the context of methods 1500, 1510, 1520, 1530 and 1540, performing the conversion is based on at least one of (a) a video content of the current video block, (b) a message signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), a LCU row, a group of LCUs, a transform unit (TU) or a prediction unit (PU), (c) a position of the CU, PU or TU, (d) a height or a width of the current video block or a neighboring block, (e) a shape of the current video block or the neighboring block, (f) a prediction mode of the current video block, (g) an intra mode of the current video block or the neighboring block, (h) a motion vector or a block vector of the current video block or the neighboring block, (i) an indication of the color format in the bitstream representation, (j) a coding tree structure of the current video block, (k) a slice type, a tile group type or a picture type of a slice, tile group or picture, respectively, comprising the current video block, (l) a color component of the current video block, (m) a temporal layer identification (ID) of the current video block, or (n) a profile, level or tier of a standard associated with the current video block.

Figure 16:
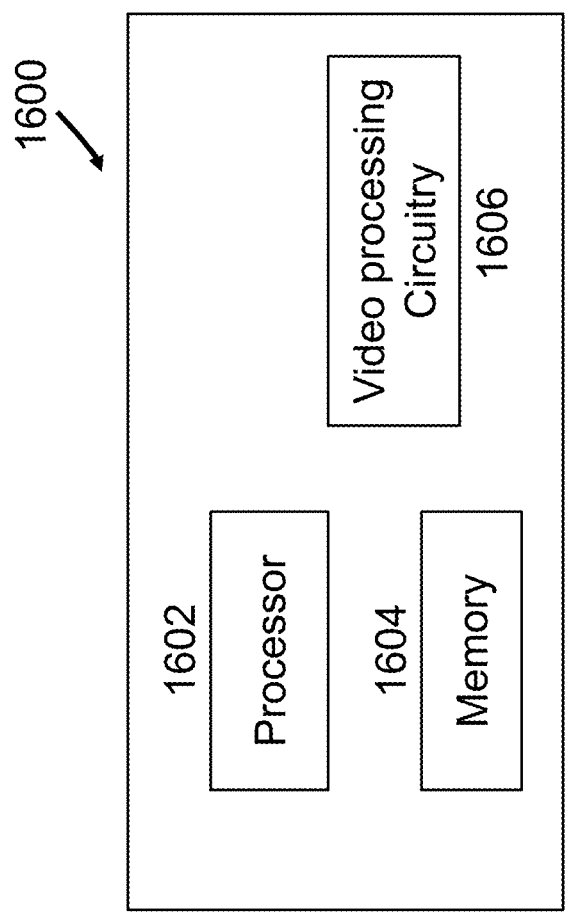
FIG. 16 is a block diagram of an example of a hardware platform for implementing a visual media decoding or a visual media encoding technique according to various embodiments of the disclosure.

FIG. 16 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606. The processor(s) 1602 may be configured to implement one or more methods (including, but not limited to, methods 1500 to 1540 and 2100 to 2800) described in the present document. The memory (memories) 1604 may be used for storing data and code used for implementing the methods and techniques described herein. The video processing hardware 1606 may be used to implement, in hardware circuitry, some techniques described in the present document.

In some embodiments, the video coding methods may be implemented using an apparatus that is implemented on a hardware platform as described with respect to FIG. 16.

Some embodiments of the disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 17:
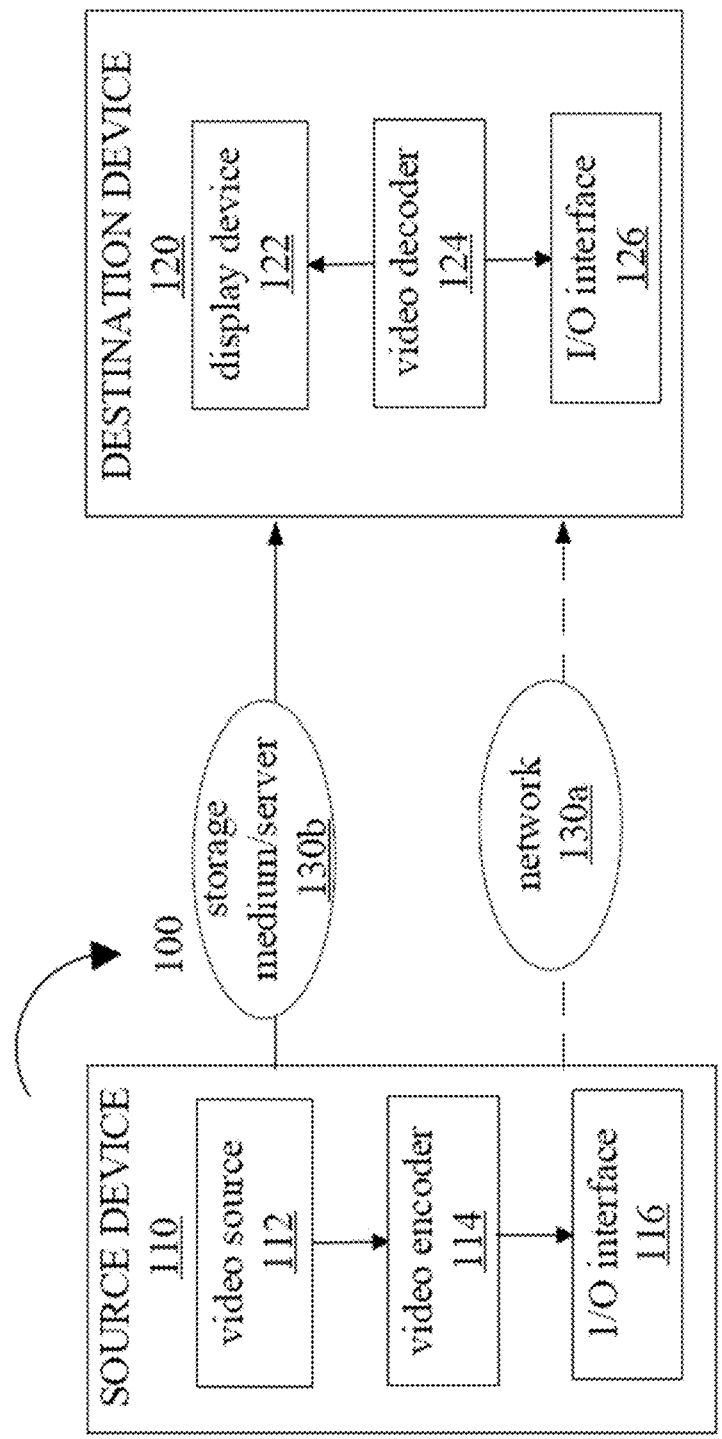
FIG. 17 is a block diagram that illustrates an example video coding system that may utilize the various embodiments of this disclosure.

FIG. 17 is a block diagram that illustrates an example video coding system 100 that may utilize the techniques of this disclosure. As shown in FIG. 17, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 18:
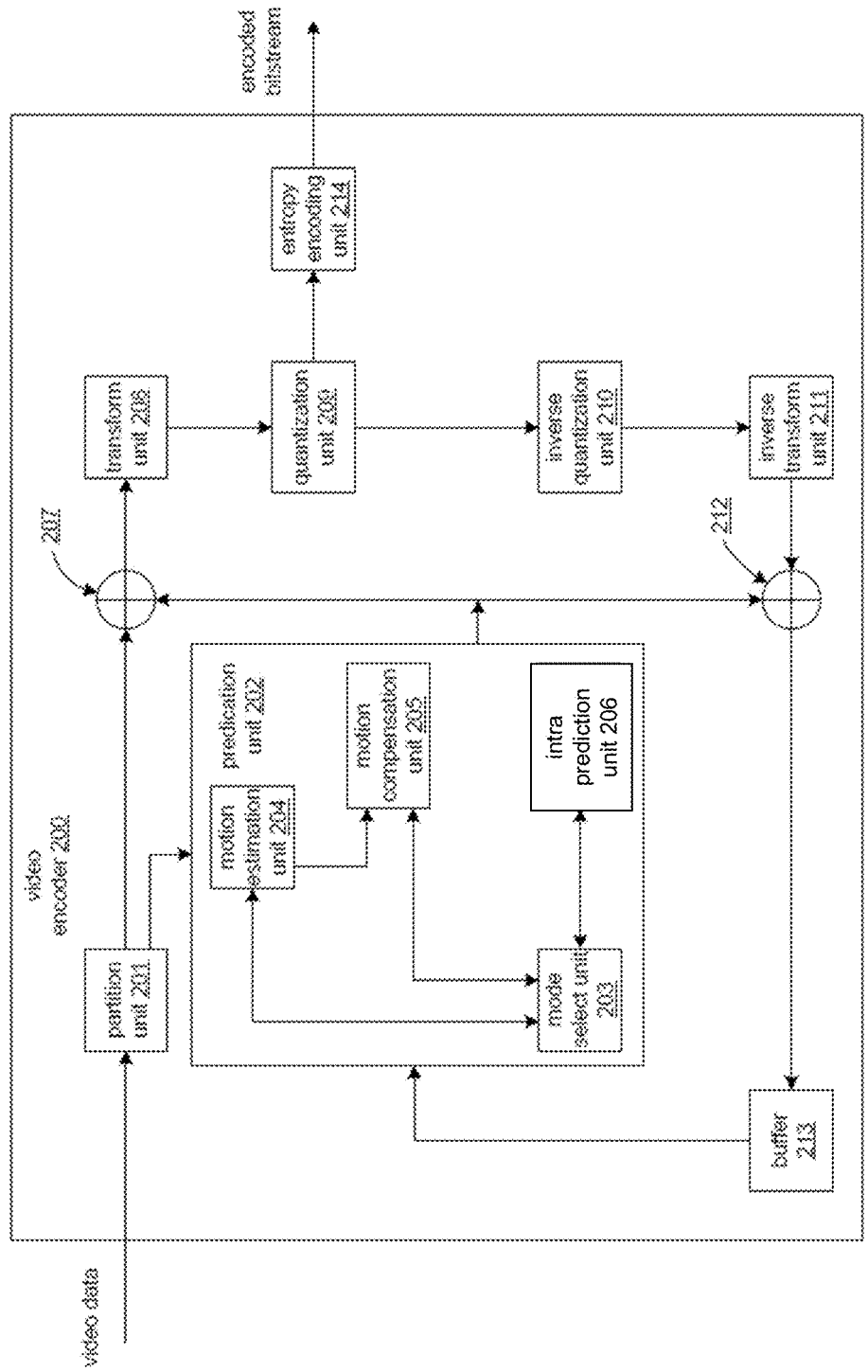
FIG. 18 is a block diagram illustrating an example of video encoder.

FIG. 18 is a block diagram illustrating an example of video encoder 200, which may be video encoder 114 in the system 100 illustrated in FIG. 17.

Video encoder 200 may be configured to perform any or all of the techniques of this disclosure. In the example of FIG. 18, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 18 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 19:
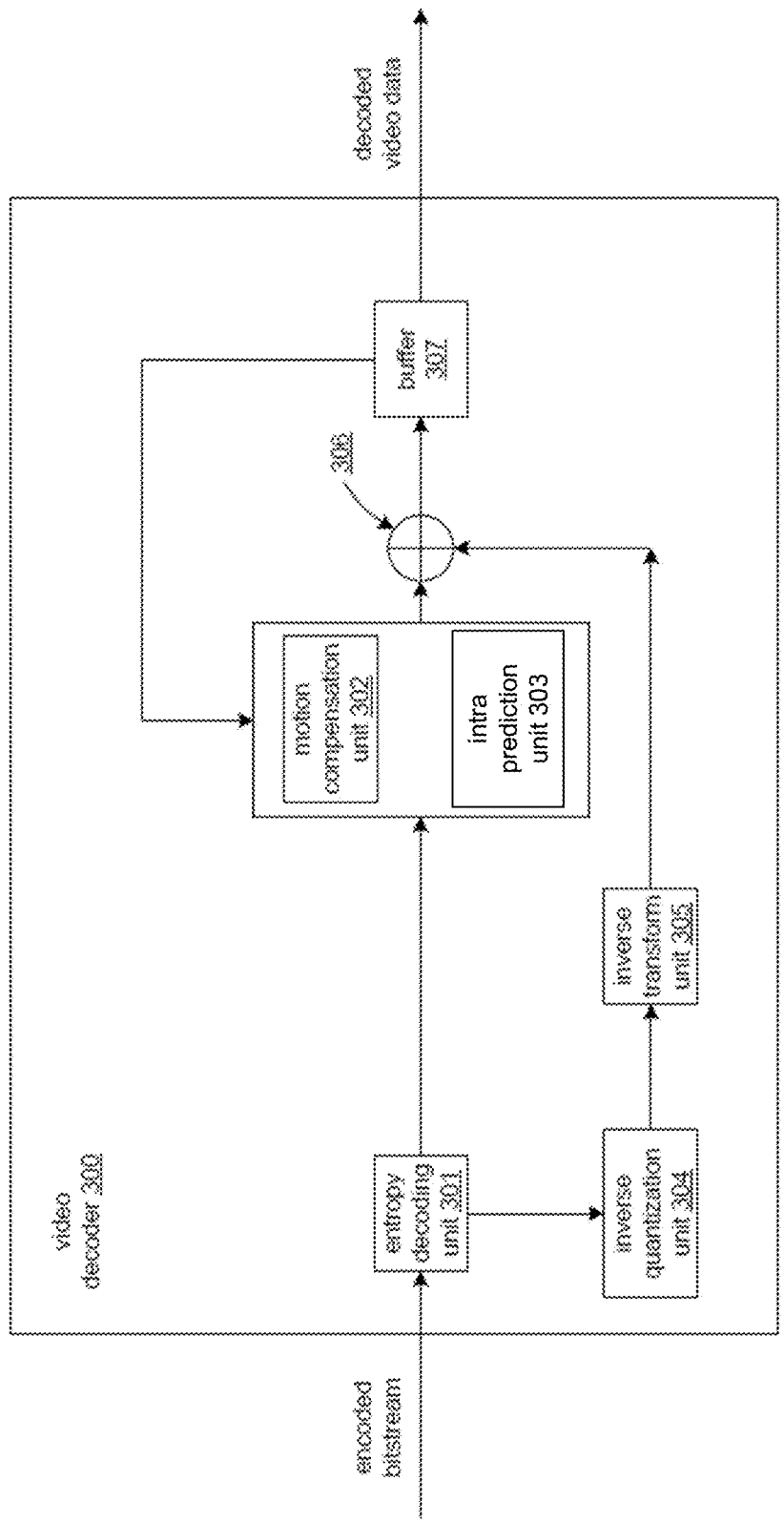
FIG. 19 is a block diagram illustrating an example of video decoder.

FIG. 19 is a block diagram illustrating an example of video decoder 300 which may be video decoder 124 in the system 100 illustrated in FIG. 17.

The video decoder 300 may be configured to perform any or all of the techniques of this disclosure. In the example of FIG. 19, the video decoder 300 includes a plurality of functional components. The techniques described in this disclosure may be shared among the various components of the video decoder 300. In some examples, a processor may be configured to perform any or all of the techniques described in this disclosure.

In the example of FIG. 19, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 18).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 20:
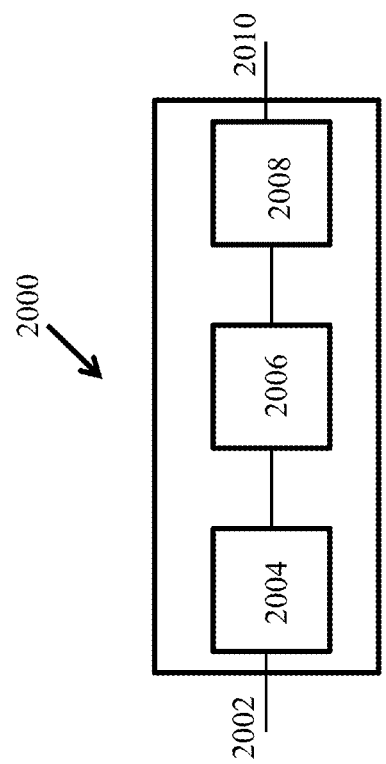
FIG. 20 is a block diagram showing an example video processing system according to various embodiments of the disclosure.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), PCI, IDE interface, and the like. The techniques described in the present document may be embodied in various electronic devices such as mobile phones, laptops, smartphones or other devices that are capable of performing digital data processing and/or video display.

Figure 21:
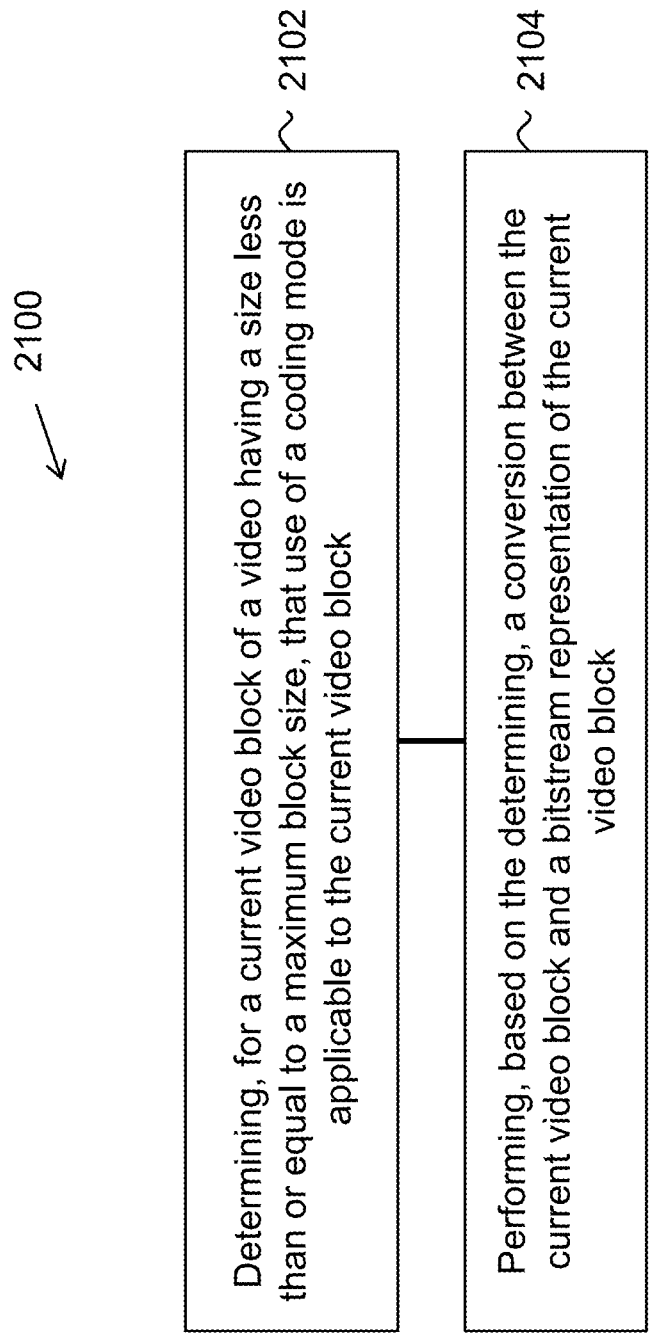

FIG. 21 shows a flowchart of an exemplary method for video processing. The method 2100 includes determining 2102, for a current video block of a video having a size less than or equal to a maximum block size, that use of a coding mode is applicable to the current video block; and performing 2104, based on the determining, a conversion between the current video block and a bitstream representation of the current video block, wherein the performing the conversion, during an encoding operation, includes using the coding mode in which the current video block is coded without performing a forward transform operation, or wherein the performing the conversion, during a decoding operation, includes using the coding mode in which the current video block is generated from the bitstream representation without performing an inverse transform operation.

In some embodiments for method 2100, the coding mode is a transform skip (TS) mode. In some embodiments for method 2100, the coding mode is a quantized residual block differential pulse-code modulation (QR-BDPCM) mode in which a difference between a quantized residual of an intra prediction of the current video block and a prediction of the quantized residual is represented in the bitstream representation for the current video block using a differential pulse coding modulation (DPCM) representation. In some embodiments for method 2100, the maximum block size is greater than 32. In some embodiments for method 2100, the maximum block size is 64 or 128. In some embodiments for method 2100, the bitstream representation includes a syntax element, log 2_transform_skip_max_size_minus2, that indicates the maximum block size used for TS mode, and the syntax element is configured to be in a range from 0 to 4.

In some embodiments for method 2100, the maximum block size for the current video block used in the TS mode or in the QR-BDPCM mode is not greater than a maximum transform block size. In some embodiments for method 2100, the maximum block size for the current video block used in the TS mode or in the QR-BDPCM mode is based on a maximum transform block size. In some embodiments for method 2100, the maximum block size for the current video block used in the TS mode or in the QR-BDPCM mode is equal to the maximum transform block size. In some embodiments for method 2100, the maximum block size for the current video block used in the TS mode or in the QR-BDPCM mode is equal to one quarter of the maximum transform block size. In some embodiments for method 2100, an indication of the maximum transform block size is signaled in the bitstream representation, and wherein the bitstream representation excludes an indication of the maximum block size used in the TS mode or in the QR-BDPCM mode. In some embodiments for method 2100, an indication of a ratio between the maximum transform block size and the maximum block size is signaled in the bitstream representation.

In some embodiments for method 2100, the bitstream representation includes a syntax element that indicates the maximum block size used for TS mode or for the QR-BDPCM mode, and the syntax element is predictively coded using the maximum block size relative to the maximum transform block size. In some embodiments for method 2100, the coding mode is applicable to the current video block when the current video block is coded using an intra block copy (IBC) mode. In some embodiments for method 2100, the bitstream representation includes a syntax element that indicates whether a transform skip (TS) mode is applied to the current video block coded using the IBC mode. In some embodiments for method 2100, the bitstream representation includes a syntax element that indicates whether a discrete cosine transform type II (DCT2) transform is applied to the current video block coded using the IBC mode. In some embodiments for method 2100, the bitstream representation includes a syntax element, log 2_ibc_transform_skip_max_size_minus, that indicates the maximum block size for the IBC mode. In some embodiments for method 2100, the syntax element is signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), a LCU row, or a group of LCUs for the current video block.

Figure 22:
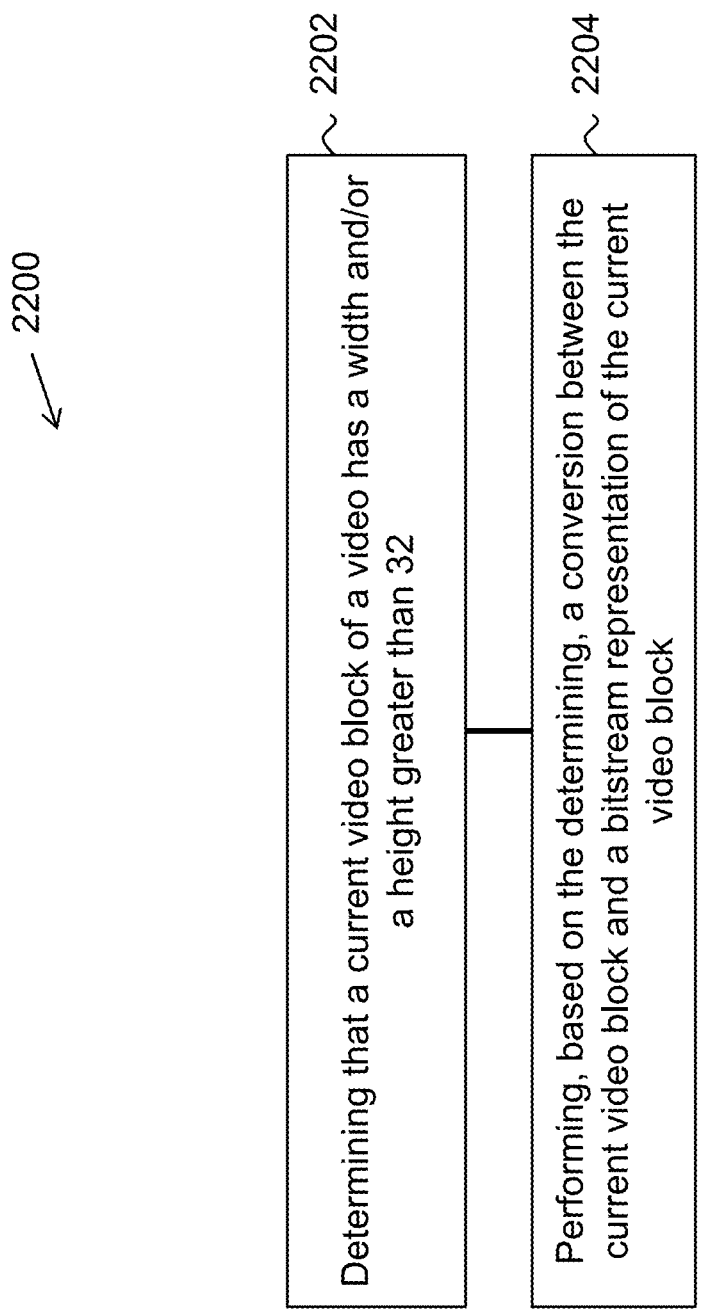

FIG. 22 shows a flowchart of an exemplary method for video processing. The method 2200 includes determining 2202 that a current video block of a video has a width and/or a height greater than 32 (e.g., 32 pixels); and performing 2204, based on the determining, a conversion between the current video block and a bitstream representation of the current video block, wherein the performing the conversion, during an encoding operation, includes coding the current video block without performing a forward transform operation, or wherein the performing the conversion, during a decoding operation, includes generating the current video block from the bitstream representation without performing an inverse transform operation.

In some embodiments for method 2200, the bitstream representation excludes side information related to the multiple transform selection (MTS) mode or the reduced secondary transform (RST) mode. In some embodiments for method 2200, only a transform skip mode (TS) is applicable to the current video block. In some embodiments for method 2200, a multiple transform set (MTS) index that indicates whether the TS mode is applicable to the current video block is inferred to be 1. In some embodiments for method 2200, a quantized residual block differential pulse-code modulation (QR-BDPCM) mode is applicable to the current video block, wherein, in the QR-BDPCM mode, a difference between a quantized residual of an intra prediction of the current video block and a prediction of the quantized residual is represented in the bitstream representation for the current video block using a differential pulse coding modulation (DPCM) representation.

Figure 23:
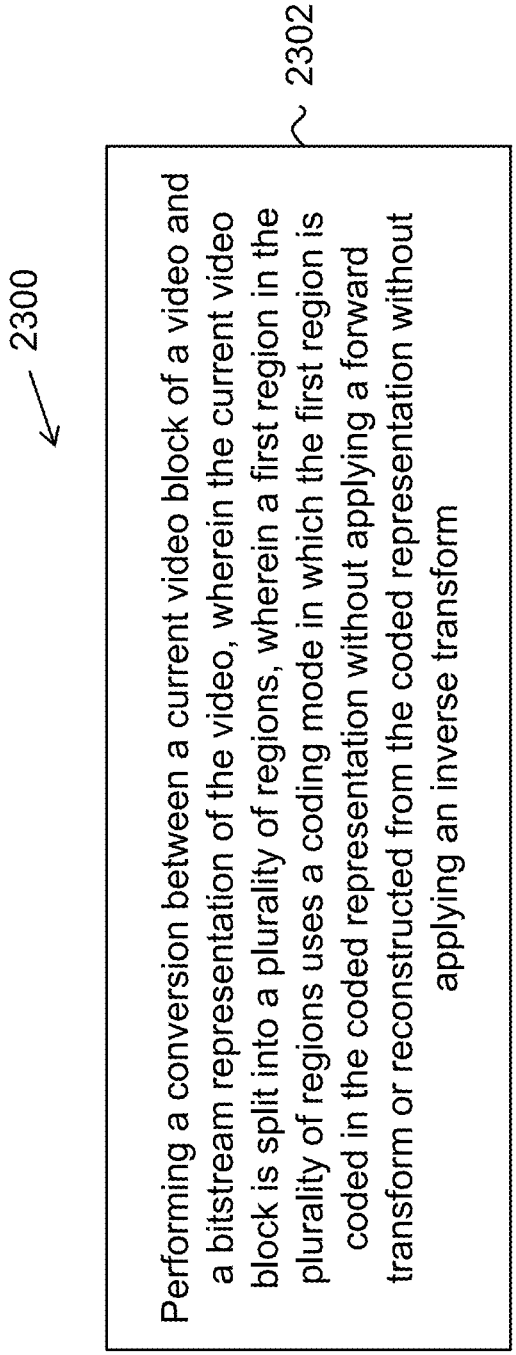

FIG. 23 shows a flowchart of an exemplary method for video processing. The method 2300 includes performing 2302 a conversion between a current video block of a video and a bitstream representation of the video, wherein the current video block is split into a plurality of regions, and wherein a first region in the plurality of regions uses a coding mode in which the first region is coded in the coded representation without applying a forward transform or reconstructed from the coded representation without applying an inverse transform.

In some embodiments for method 2300, one or more remaining regions from the plurality of regions other than the first region are not coded. In some embodiments for method 2300, one or more transform coefficients of the one or more remaining regions are set to zero. In some embodiments for method 2300, at least one region from the plurality of regions is coded with the coding mode, and one or more remaining regions from the plurality of regions other than the at least one region are coded with a second coding mode in which the one or more remaining regions are coded in the coded representation by applying the forward transform or reconstructed from the coded representation by applying the inverse transform. In some embodiments for method 2300, at least one region from the plurality of regions is coded with the coding mode, at least one other region from the plurality of regions is coded with a second coding mode in which the at least one other region is coded in the coded representation by applying the forward transform or reconstructed from the coded representation by applying the inverse transform, and one or more remaining regions from the plurality of regions other than the at least one region and the at least one other region are not coded. In some embodiments for method 2300, one or more transform coefficients of the one or more remaining regions are set to zero. In some embodiments for method 2300, the current video block is split into the plurality of regions based on a sub-block transform (SBT) process applied to the current video block.

In some embodiments for method 2300, the current video block is split along a horizontal direction or a vertical direction. In some embodiments for method 2300, the first region of the plurality of regions located to a right of the current video block, and a second region of the plurality of regions located to a left of the current video block has transform coefficients that are set to zero. In some embodiments for method 2300, the first region of the plurality of regions located to a left of the current video block, and a second region of the plurality of regions located to a right of the current video block has transform coefficients that are set to zero. In some embodiments for method 2300, the first region of the plurality of regions located to bottom of the current video block, and a second region of the plurality of regions located to top of the current video block has transform coefficients that are set to zero. In some embodiments for method 2300, the first region of the plurality of regions located to top of the current video block, and a second region of the plurality of regions located to bottom of the current video block has transform coefficients that are set to zero.

Figure 24:
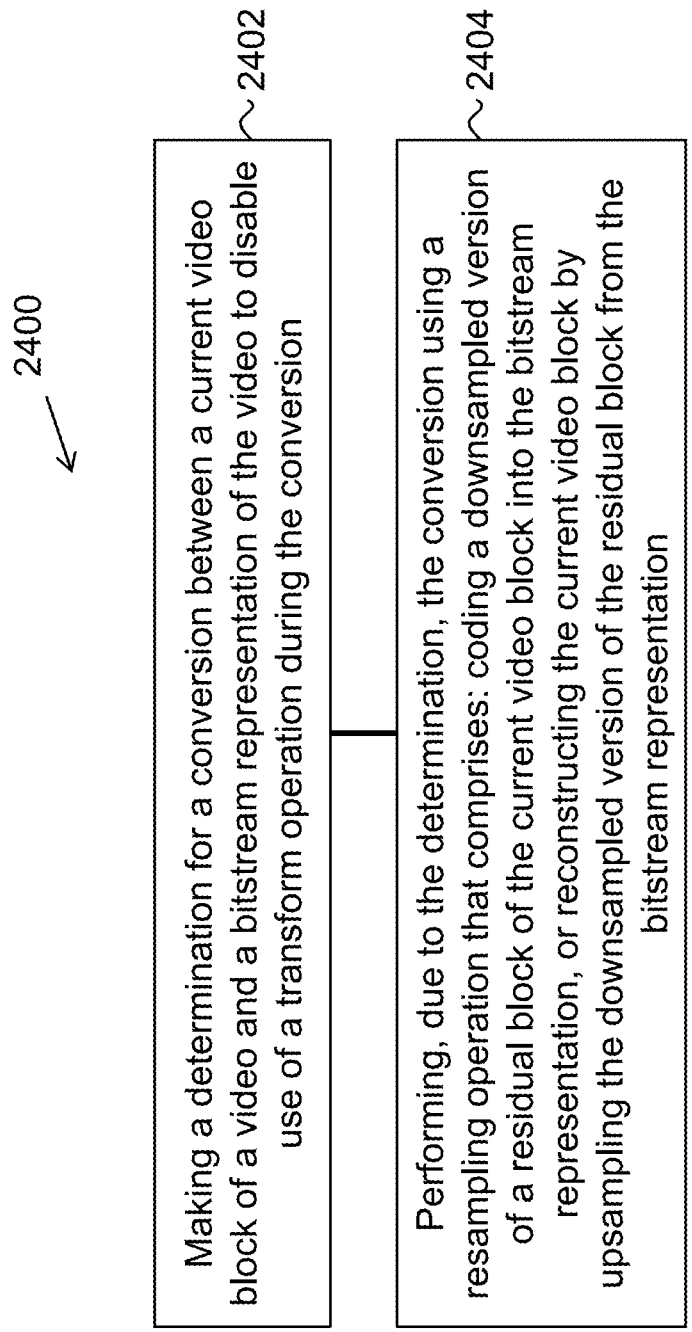

FIG. 24 shows a flowchart of an exemplary method for video processing. The method 2400 includes making 2402 a determination for a conversion between a current video block of a video and a bitstream representation of the video to disable use of a transform operation during the conversion; and performing 2404, due to the determination, the conversion using a resampling operation that comprises: coding a downsampled version of a residual block of the current video block into the bitstream representation, or reconstructing the current video block by upsampling the downsampled version of the residual block from the bitstream representation.

In some embodiments for method 2400, the residual block is downsampled using a non-uniform downsampling process in which a first set of downsampled samples within a region of the residual block are used for the performing the conversion and a second set of downsampled samples outside the region are set to zero. In some embodiments for method 2400, the region of the residual block is a top-left region of the residual block. In some embodiments for method 2400, a width and/or a height of the region of the residual block is based on a size of the residual block. In some embodiments for method 2400, the residual block is downsampled using a uniform downsampling process in which downsampled samples within the residual block are used for the performing the conversion.

FIG. 25 shows a flowchart of an exemplary method for video processing. The method 2500 includes performing 2502 a conversion between a current video block of a video and a bitstream representation of the video; wherein the conversion uses a sub-block transform mode in which the current video block is split into multiple horizontal or vertical partitions; and wherein, during an encoding operation, a forward transform is applied to residual values of some of the partitions of the current video block for coding into the bitstream representation, wherein the forward transform comprises a vertical transform and a horizontal transform, at least one being an identity transform, or wherein, during a decoding operation, an inverse transform is applied to residual values of the current video block decoded from the bitstream representation to generate the current video block, wherein the inverse transform comprises an inverse vertical transform and an inverse horizontal transform, at least one being an identity transform.

In some embodiments for method 2500, the identity transform is applied to a first dimension of a partition, and wherein a Discrete Sine Transform of type VII (DST-7) is applied to a second dimension of the partition. In some embodiments for method 2500, the identity transform is applied to a first dimension of a partition, and wherein a Discrete Cosine Transform of type II (DCT-2) is applied to a second dimension of the partition. In some embodiments for method 2500, the identity transform is applied to a first dimension and a second dimension of a partition. In some embodiments for method 2500, a partition is located to a left or a right of the current video block in response to the SBT applying a vertical transform, or the partition is located to top or bottom of the current video block in response to the SBT applying a horizontal transform.

In some embodiments for method(s) 2100 to 2500, whether the conversion is performed is based on at least one of: (a) a video content of the current video block, (b) a message signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), a LCU row, a group of LCUs, a transform unit (TU) or a prediction unit (PU), (c) a position of the CU, PU or TU, (d) a height or a width of the current video block or a neighboring block, (e) a shape of the current video block or the neighboring block, (f) a prediction mode of the current video block, (g) an intra mode of the current video block or the neighboring block, (h) a motion vector or a block vector of the current video block or the neighboring block, (i) an indication of the color format in the bitstream representation, (j) a coding tree structure of the current video block, (k) a slice type, a tile group type or a picture type of a slice, tile group or picture, respectively, comprising the current video block, (l) a color component of the current video block, (m) a temporal layer identification (ID) of the current video block, or (n) a profile, level or tier of a standard associated with the current video block. In some embodiments for method(s) 2100 to 2500, the video content includes a screen content or a natural content. In some embodiments for method(s) 2100 to 2500, the prediction mode of the current video block is an intra block copy (IBC) mode.

Figure 26:
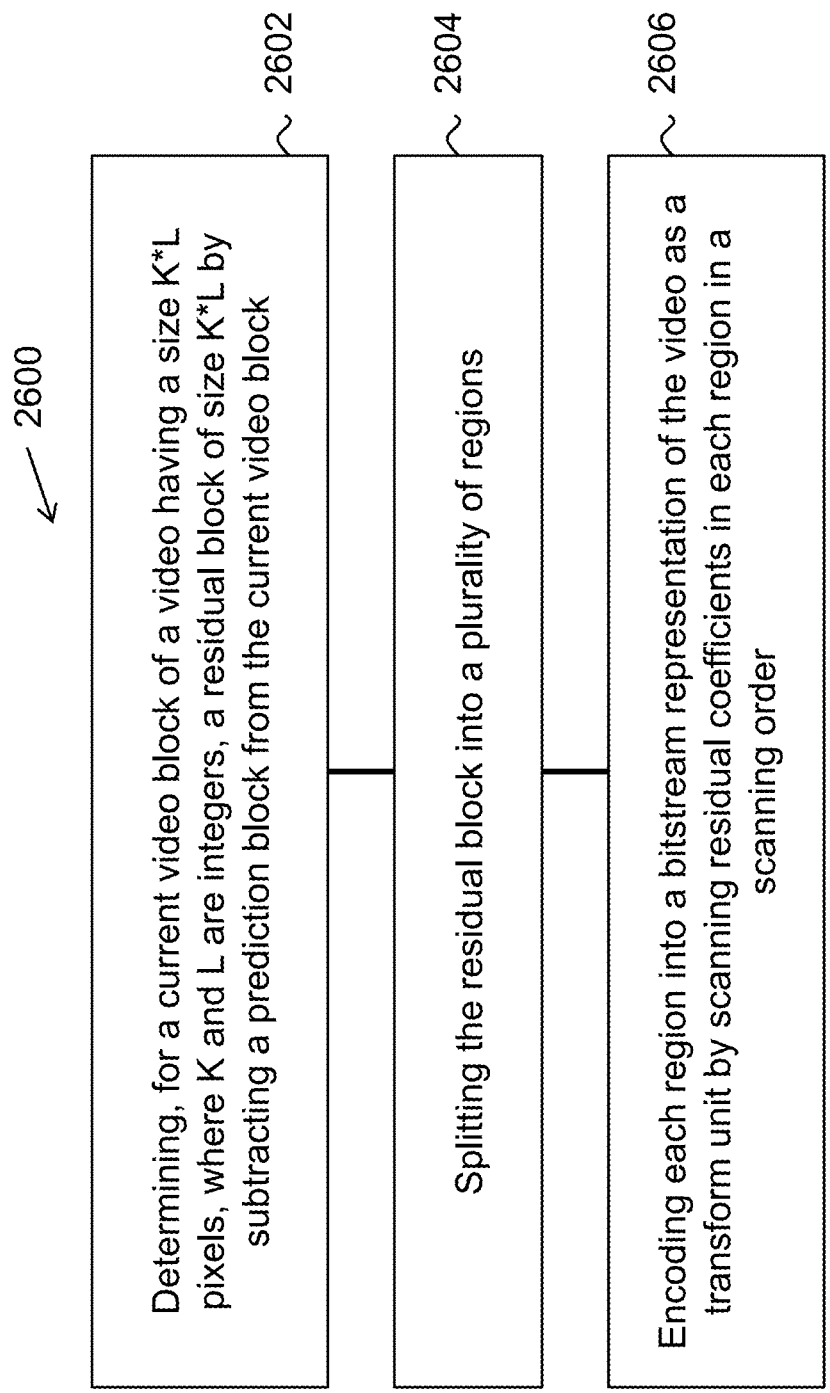

FIG. 26 shows a flowchart of an exemplary method for video processing. The method 2600 includes determining 2602, for a current video block of a video having a size K*L pixels, where K and L are integers, a residual block of size K*L by subtracting a prediction block from the current video block; splitting 2604 the residual block into a plurality of regions; and encoding 2606 each region into a bitstream representation of the video as a transform unit by scanning residual coefficients in each region in a scanning order, wherein a region from the plurality of regions is encoded according to a transform skip (TS) mode in which, during an encoding operation, the current video block is coded without performing a forward transform operation.

In some embodiments for method 2600, a first region from the plurality of regions is encoded according to a coding mode that does not allow usage of residual information from a second region from the plurality of regions. In some embodiments for method 2600, a first region from the plurality of regions is encoded according to a coding mode that allows usage of residual information from a second region from the plurality of regions. In some embodiments for method 2600, the splitting is based on a size of the residual block. In some embodiments for method 2600, the splitting is based on coded information of the current video block. In some embodiments for method 2600, the coded information includes an intra prediction direction or a coding mode of the current video block. In some embodiments for method 2600, the splitting is based on a maximum block size for which a transform skip (TS) mode. In some embodiments for method 2600, the splitting is based on a maximum block size allowed for a transform process. In some embodiments for method 2600, the maximum block size allowed for a transform skip mode is equal to the maximum block size allowed for a transform process. In some embodiments for method 2600, the size of the residual block is larger than the maximum block size allowed for the transform skip mode.

In some embodiments for method 2600, wherein contexts are derived for each region of the plurality of regions, wherein the contexts are derived for a first set of transform coefficients of a first region of the plurality of regions, and wherein the contexts for the first set of transform coefficients are not dependent on a second set of transform coefficients obtained for a second region of the plurality of regions. In some embodiments for method 2600, the first set of transform coefficients does not include a transform coefficient from the second set of transform coefficients. In some embodiments for method 2600, wherein contexts are derived for each region of the plurality of regions, wherein the contexts are derived for a first set of transform coefficients of a first region of the plurality of regions, and wherein the contexts for the first set of transform coefficients are dependent on a second set of transform coefficients in a second region of the plurality of regions. In some embodiments for method 2600, the first set of transform coefficients includes a transform coefficient from the second set of transform coefficients.

Figure 27:
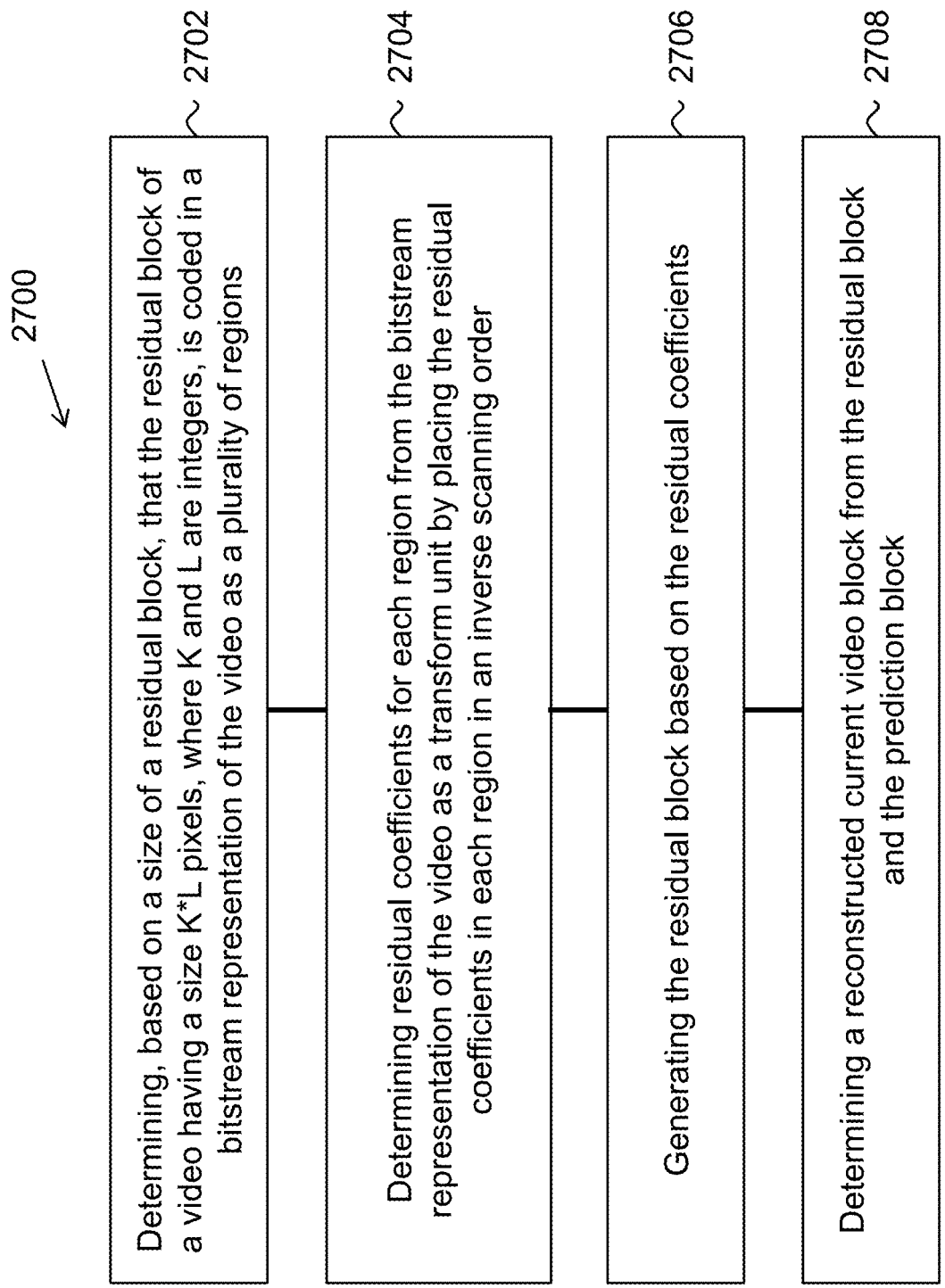

FIG. 27 shows a flowchart of an exemplary method for video processing. The method 2700 includes determining 2702, based on a size of a residual block, that the residual block of a video having a size K*L pixels, where K and L are integers, is coded in a bitstream representation of the video as a plurality of regions, wherein each region represents a portion of the residual block of a difference between a portion of a current video block and a prediction block corresponding to the portion of the current video block; determining 2704 residual coefficients for each region from the bitstream representation of the video as a transform unit by placing the residual coefficients in each region in an inverse scanning order, wherein the residual coefficients for each region are determined based on a selective use of an inverse transform operation according to a coding mode indicator; generating 2706 the residual block based on the residual coefficients; and determining 2708 a reconstructed current video block from the residual block and the prediction block.

In some embodiments for method 2700, residual coefficients of a first region from the plurality of regions are determined according to the coding mode that does not allow usage of residual coefficients from a second region from the plurality of regions. In some embodiments for method 2700, residual coefficients of a first region from the plurality of regions are determined according to the coding mode that allows usage of residual coefficients from a second region from the plurality of regions.

In some embodiments for method 2700, the plurality of regions are split from the residual block based on coded information of the current video block. In some embodiments for method 2700, the coded information includes an intra prediction direction or the coding mode of the current video block. In some embodiments for method 2700, the plurality of regions are split from the residual block further based on a maximum block size allowed for a transform skip (TS) mode, in which, during an decoding operation, the region is coded without performing the inverse transform operation. In some embodiments for method 2700, wherein the splitting is based on a maximum block size allowed for a transform process. In some embodiments for method 2700, the maximum block size allowed for a transform skip mode is equal to the maximum block size allowed for a transform process. In some embodiments for method 2700, the size of the residual block is larger than the maximum block size allowed for the transform skip mode. In some embodiments for method 2700, wherein contexts are derived for each region of the plurality of regions, wherein the contexts are derived for a first set of transform coefficients of a first region of the plurality of regions, and wherein the contexts for the first set of transform coefficients are not dependent on a second set of transform coefficients obtained for a second region of the plurality of regions.

In some embodiments for method 2700, the first set of transform coefficients do not include a transform coefficient from the second set of transform coefficients. In some embodiments for method 2700, wherein contexts are derived for each region of the plurality of regions, wherein the contexts are derived for a first set of transform coefficients of a first region of the plurality of regions, and wherein the contexts for the first set of transform coefficients are dependent on a second set of transform coefficients obtained for a second region of the plurality of regions. In some embodiments for method 2700, the first set of transform coefficients includes a transform coefficient from the second set of transform coefficients. In some embodiments for method(s) 2600 and 2700, the current video block includes a pixel that includes one sample corresponding to a color component. In some embodiments for method(s) 2600 and 2700, the current video block includes a pixel that includes two samples corresponding to two color components. In some embodiments for method(s) 2600 and 2700, the current video block includes a pixel that includes three samples corresponding to three color components.

Figure 28:
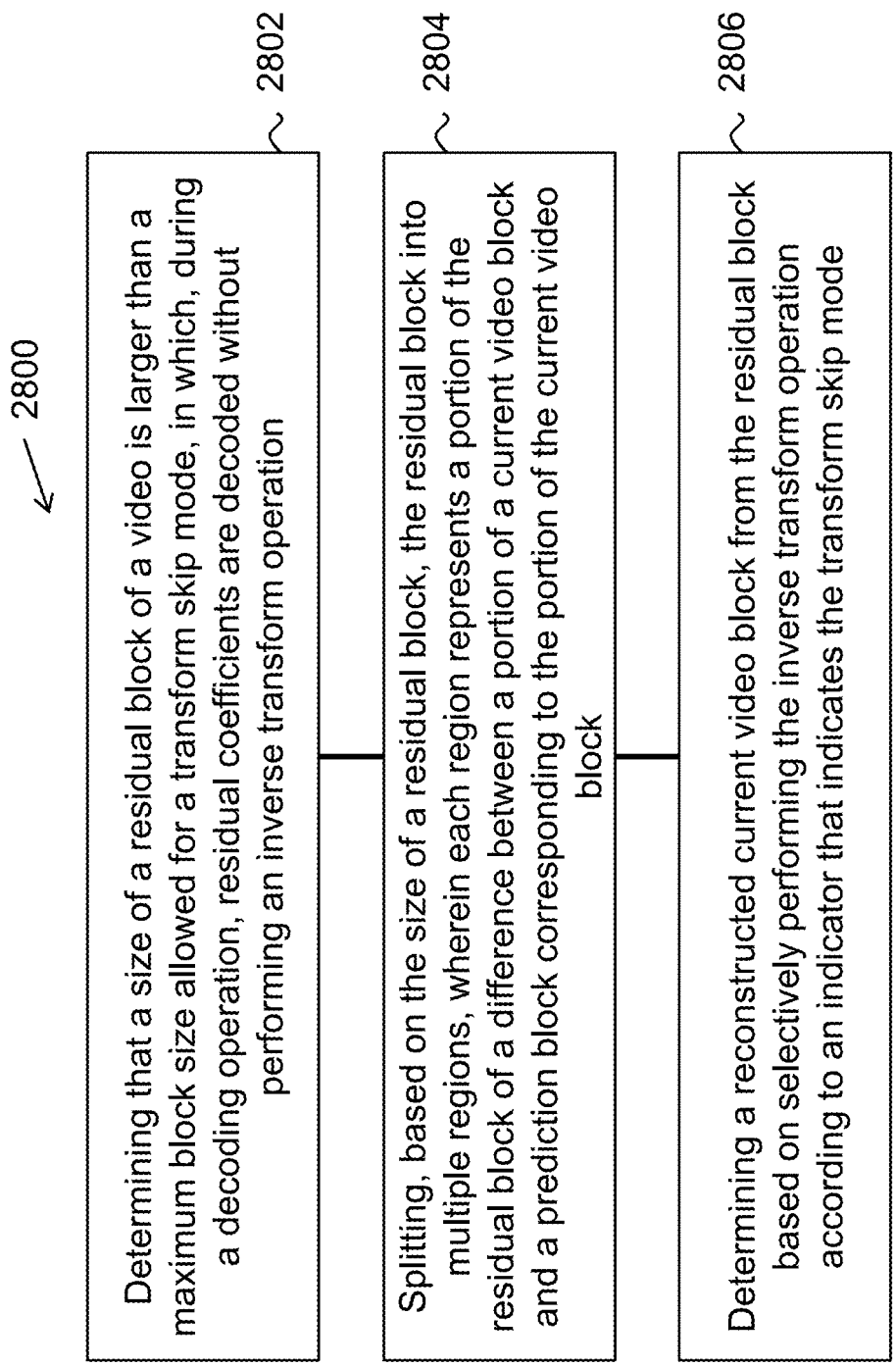

FIG. 28 shows a flowchart of an exemplary method for video processing. The method 2800 includes determining 2802 that a size of a residual block of a video is larger than a maximum block size allowed for a transform skip mode, in which, during a decoding operation, residual coefficients are decoded without performing an inverse transform operation; splitting 2804, based on the size of a residual block, the residual block into multiple regions, wherein each region represents a portion of the residual block of a difference between a portion of a current video block and a prediction block corresponding to the portion of the current video block; and determining 2806 a reconstructed current video block from the residual block based on selectively performing the inverse transform operation according to an indicator that indicates the transform skip mode. In some embodiments for method 2800, the maximum block size allowed for the transform skip mode is equal to a maximum block size allowed for a transform process.

From the foregoing, it will be appreciated that specific embodiments of the present disclosure have been described herein for purposes of illustration, but that various modifications may be made without deviating from the scope of the embodiments. Accordingly, the embodiments of the present disclosure are not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically EPROM (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any embodiment or of what may be claimed, but rather as descriptions of features that may be specific to particular embodiments of particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
  determining, for a conversion between a current video block of a video and a bitstream of the video, that a transform skip mode is applied to a residual block of the current video block, wherein a sample of the residual block represents a prediction residual between a sample of the current video block and a prediction sample corresponding to the sample of the current video block, and wherein, in the transform skip mode, a transform operation or an inverse transform operation is skipped for the prediction residual; and
  performing the conversion based on the determining,
  wherein the residual block is coded in the bitstream as a plurality of regions, wherein each region represents a portion of the residual block, wherein the residual block has a size K*L, wherein K and L are integers, and wherein a size Ki*Li of an i-th region of the plurality of regions is based on the size of the residual block,
  wherein a third syntax element indicating transform coefficient levels of a last region of the plurality of regions is not included in the bitstream, and
  wherein a context model index of the third syntax element is calculated based on a sum of a context model index of the third syntax element of a left neighboring sample and a context model index of the third syntax element of an above neighboring sample.

2. The method of claim 1, wherein residual information of a sample of a first region from the plurality of regions is allowed to be used in a context derivation for a sample of a second region from the plurality of regions.

3. The method of claim 1, wherein the transform skip mode is applied to the residual block when the size of the residual block is less than or equal to an allowed maximum block size used for the transform skip mode, which is indicated by a first syntax element included in the bitstream.

4. The method of claim 3, wherein the allowed maximum block size is in a range of 4 to 32, inclusive.

5. The method of claim 1, wherein a second syntax element indicating a last significant scanning position is not included in the bitstream for a coefficients coding in the transform skip mode.

6. The method of claim 1, wherein a context model index of a fourth syntax element is calculated based on a value of the fourth syntax element of a left neighboring sample and a value of the fourth syntax element of an above neighboring sample, wherein the fourth syntax element included in the bitstream indicates whether a transform coefficient level of the sample of the residual block is non-zero.

7. The method of claim 1, wherein a context model of a fifth syntax element for the residual block that uses the transform skip mode is different from a context model of the fifth syntax element for a block that does not use the transform skip mode, wherein the fifth syntax element included in the bitstream indicates a sign of a transform coefficient level of the sample of the residual block.

8. The method of claim 1, wherein the conversion includes encoding the current video block into the bitstream.

9. The method of claim 1, wherein the conversion includes decoding the current video block from the bitstream.

10. An apparatus for processing video data comprising a processor and a non-transitory memory with instructions thereon, wherein the instructions upon execution by the processor, cause the processor to:
  determine, for a conversion between a current video block of a video and a bitstream of the video, that a transform skip mode is applied to a residual block of the current video block, wherein a sample of the residual block represents a prediction residual between a sample of the current video block and a prediction sample corresponding to the sample of the current video block, and wherein, in the transform skip mode, a transform operation or an inverse transform operation is skipped for the prediction residual; and
  perform the conversion based on the determining,
  wherein the residual block is coded in the bitstream as a plurality of regions, wherein each region represents a portion of the residual block, wherein the residual block has a size K*L, wherein K and L are integers, and wherein a size Ki*Li of an i-th region of the plurality of regions is based on the size of the residual block,
  wherein a third syntax element indicating transform coefficient levels of a last region of the plurality of regions is not included in the bitstream, and
  wherein a context model index of the third syntax element is calculated based on a sum of a context model index of the third syntax element of a left neighboring sample and a context model index of the third syntax element of an above neighboring sample.

11. The apparatus of claim 10, wherein residual information of a sample of a first region from the plurality of regions is allowed to be used in a context derivation for a sample of a second region from the plurality of regions.

12. The apparatus of claim 10, wherein the transform skip mode is applied to the residual block when the size of the residual block is less than or equal to an allowed maximum block size used for the transform skip mode, which is indicated by a first syntax element included in the bitstream, and wherein the allowed maximum block size is in a range of 4 to 32, inclusive.

13. The apparatus of claim 10, wherein a context model index of a fourth syntax element is calculated based on a value of the fourth syntax element of a left neighboring sample and a value of the fourth syntax element of an above neighboring sample, wherein the fourth syntax element included in the bitstream indicates whether a transform coefficient level of the sample of the residual block is non-zero, wherein a context model of a fifth syntax element for the residual block that uses the transform skip mode is different from a context model of the fifth syntax element for a block that does not use the transform skip mode, and wherein the fifth syntax element included in the bitstream indicates a sign of a transform coefficient level of the sample of the residual block.

14. A non-transitory computer-readable storage medium storing instructions that cause a processor to:
  determine, for a conversion between a current video block of a video and a bitstream of the video, that a transform skip mode is applied to a residual block of the current video block, wherein a sample of the residual block represents a prediction residual between a sample of the current video block and a prediction sample corresponding to the sample of the current video block, and wherein, in the transform skip mode, a transform operation or an inverse transform operation is skipped for the prediction residual; and perform the conversion based on the determining, wherein the residual block is coded in the bitstream as a plurality of regions, wherein each region represents a portion of the residual block, wherein the residual block has a size K*L, wherein K and L are integers, and wherein a size Ki*Li of an i-th region of the plurality of regions is based on the size of the residual block, wherein a third syntax element indicating transform coefficient levels of a last region of the plurality of regions is not included in the bitstream, and wherein a context model index of the third syntax element is calculated based on a sum of a context model index of the third syntax element of a left neighboring sample and a context model index of the third syntax element of an above neighboring sample.

15. The non-transitory computer-readable storage medium of claim 14, wherein residual information of a sample of a first region from the plurality of regions is allowed to be used in a context derivation for a sample of a second region from the plurality of regions.

16. A non-transitory computer-readable recording medium storing a bitstream of a video which is generated by a method performed by a video processing apparatus, wherein the method comprises:

determining that a transform skip mode is applied to a residual block of a current video block of the video, wherein a sample of the residual block represents a prediction residual between a sample of the current video block and a prediction sample corresponding to the sample of the current video block, and wherein, in the transform skip mode, a transform operation or an inverse transform operation is skipped for the prediction residual; and generating the bitstream of the video based on the determining, wherein the residual block is coded in the bitstream as a plurality of regions, wherein each region represents a portion of the residual block, wherein the residual block has a size K*L, wherein K and L are integers, and wherein a size Ki*Li of an i-th region of the plurality of regions is based on the size of the residual block, wherein a third syntax element indicating transform coefficient levels of a last region of the plurality of regions is not included in the bitstream, and wherein a context model index of the third syntax element is calculated based on a sum of a context model index of the third syntax element of a left neighboring sample and a context model index of the third syntax element of an above neighboring sample.

17. The non-transitory computer-readable recording medium of claim 16, wherein residual information of a sample of a first region from the plurality of regions is allowed to be used in a context derivation for a sample of a second region from the plurality of regions.

18. The non-transitory computer-readable storage medium of claim 14, wherein the transform skip mode is applied to the residual block when the size of the residual block is less than or equal to an allowed maximum block size used for the transform skip mode, which is indicated by a first syntax element included in the bitstream, and wherein the allowed maximum block size is in a range of 4 to 32, inclusive.

19. The non-transitory computer-readable storage medium of claim 14, wherein a context model index of a fourth syntax element is calculated based on a value of the fourth syntax element of a left neighboring sample and a value of the fourth syntax element of an above neighboring sample, wherein the fourth syntax element included in the bitstream indicates whether a transform coefficient level of the sample of the residual block is non-zero, wherein a context model of a fifth syntax element for the residual block that uses the transform skip mode is different from a context model of the fifth syntax element for a block that does not use the transform skip mode, and wherein the fifth syntax element included in the bitstream indicates a sign of a transform coefficient level of the sample of the residual block.

20. The non-transitory computer-readable recording medium of claim 16, wherein the transform skip mode is applied to the residual block when the size of the residual block is less than or equal to an allowed maximum block size used for the transform skip mode, which is indicated by a first syntax element included in the bitstream, and wherein the allowed maximum block size is in a range of 4 to 32, inclusive.

* * * * *